United States Patent
Van As et al.

(10) Patent No.: US 11,580,001 B2
(45) Date of Patent: Feb. 14, 2023

(54) DYNAMIC GENERATION OF INSTRUMENTATION LOCATORS FROM A DOCUMENT OBJECT MODEL

(71) Applicant: Box, Inc., Los Altos, CA (US)

(72) Inventors: Tarrence Van As, Los Altos, CA (US); Matthew Basta, Mountain View, CA (US); Ethan Batraski, Foster City, CA (US)

(73) Assignee: Box, Inc.

( * ) Notice: Subject to any disclaimer, the term of this patent is extended or adjusted under 35 U.S.C. 154(b) by 790 days.

(21) Appl. No.: 14/938,720

(22) Filed: Nov. 11, 2015

(65) Prior Publication Data

US 2017/0132181 A1 May 11, 2017

(51) Int. Cl.
*G06F 11/34* (2006.01)
*G06F 16/957* (2019.01)
(Continued)

(52) U.S. Cl.
CPC .......... *G06F 11/3438* (2013.01); *G06F 11/30* (2013.01); *G06F 11/3466* (2013.01);
(Continued)

(58) Field of Classification Search
CPC .... G06F 17/22; G06F 11/3438; G06F 16/957; G06F 40/143; G06F 11/30; G06F 11/3466; G06F 11/3476; G06F 2201/875
(Continued)

(56) References Cited

U.S. PATENT DOCUMENTS 8,346,887 B1 * 1/2013 Kembel ............ G06F 17/30899
709/217
8,495,204 B2 * 7/2013 Shin ........................ H04L 67/02
709/224
(Continued)

OTHER PUBLICATIONS

Karns, Jason et al. "Google Analytics Tagging with HTML5 data-*Attributes" URL: "http://jasonkarns.com/blog/google-analytics-tagging/" Mar. 10, 2010.
(Continued)

*Primary Examiner* — Kavita Stanley
*Assistant Examiner* — Tionnam Burke
(74) *Attorney, Agent, or Firm* — Vista IP Law Group, LLP

(57) ABSTRACT

Systems for web page or web application instrumentation. Embodiments commence upon identification of a computer-readable user interface description comprising at least some markup language conforming to a respective document object model that is codified in a computer-readable language. An injector process modifies the user interface description by inserting markup text and code into the user interface description, where the inserted code includes instrumentation code to invoke dynamic generation of instrumentation locator IDs using the hierarchical elements found in the document object model. The modified computer-readable interface description is transmitted to a user device. Log messages are emitted upon user actions taken while using the user device. The log messages comprise the instrumentation locator IDs that are formed using hierarchical elements found in the document object model.

20 Claims, 19 Drawing Sheets

(51) Int. Cl.
   *G06F 11/30*      (2006.01)
   *G06F 40/143*     (2020.01)
(52) U.S. Cl.
   CPC ........ *G06F 11/3476* (2013.01); *G06F 16/957* (2019.01); *G06F 40/143* (2020.01); *G06F 2201/875* (2013.01)
(58) Field of Classification Search
   USPC ........................................................ 715/234
   See application file for complete search history.

(56) References Cited

U.S. PATENT DOCUMENTS

| | | | | |
|---|---|---|---|---|
| 8,869,281 B2* | 10/2014 | Call | ................... | H04L 63/1483 726/23 |
| 2006/0161816 A1* | 7/2006 | Gula | ................... | H04L 41/065 714/39 |
| 2009/0100154 A1* | 4/2009 | Stevenson | .............. | G06Q 30/02 709/220 |
| 2013/0185643 A1* | 7/2013 | Greifeneder | ............ | H04L 67/22 715/736 |
| 2014/0040786 A1* | 2/2014 | Swanson | ............... | G06F 16/957 715/760 |
| 2015/0347609 A1* | 12/2015 | Brust | ................ | G06F 17/30896 715/234 |

OTHER PUBLICATIONS

King, K. "Shearling Boots—Right Sole", URL:"http://www.homesteadnotes.com/wp-content/uploads/sites/483/2015/02/" 2010.

* cited by examiner

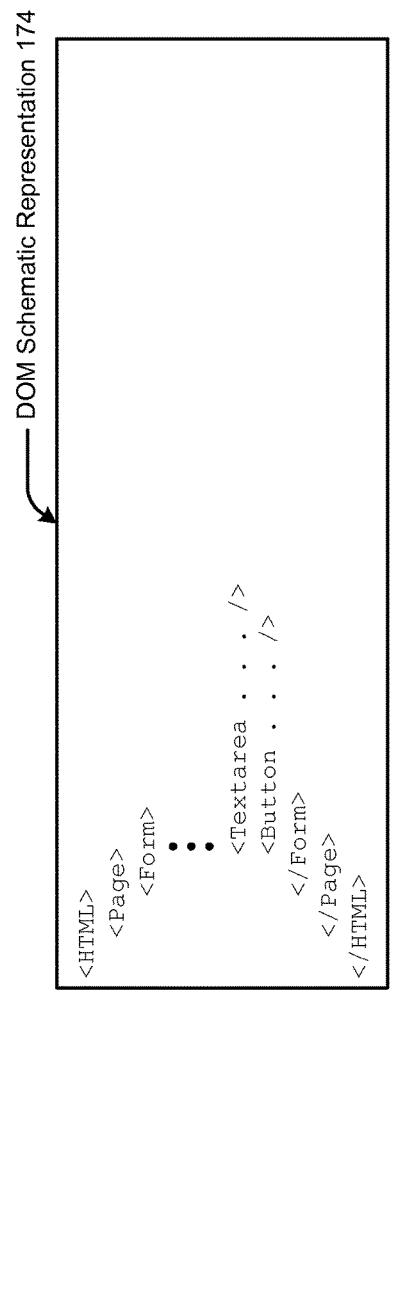
FIG. 1F1

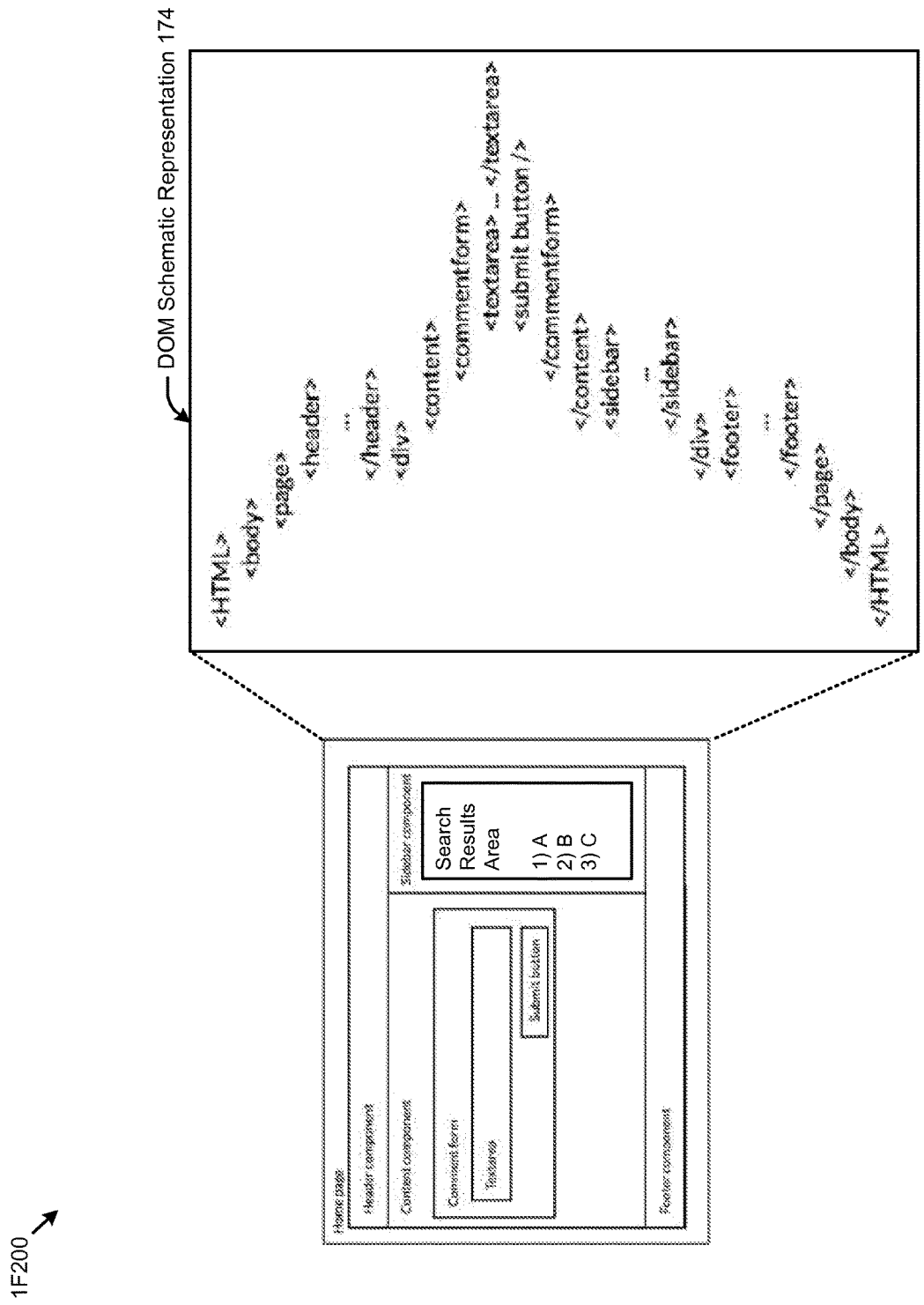
FIG. 1F2

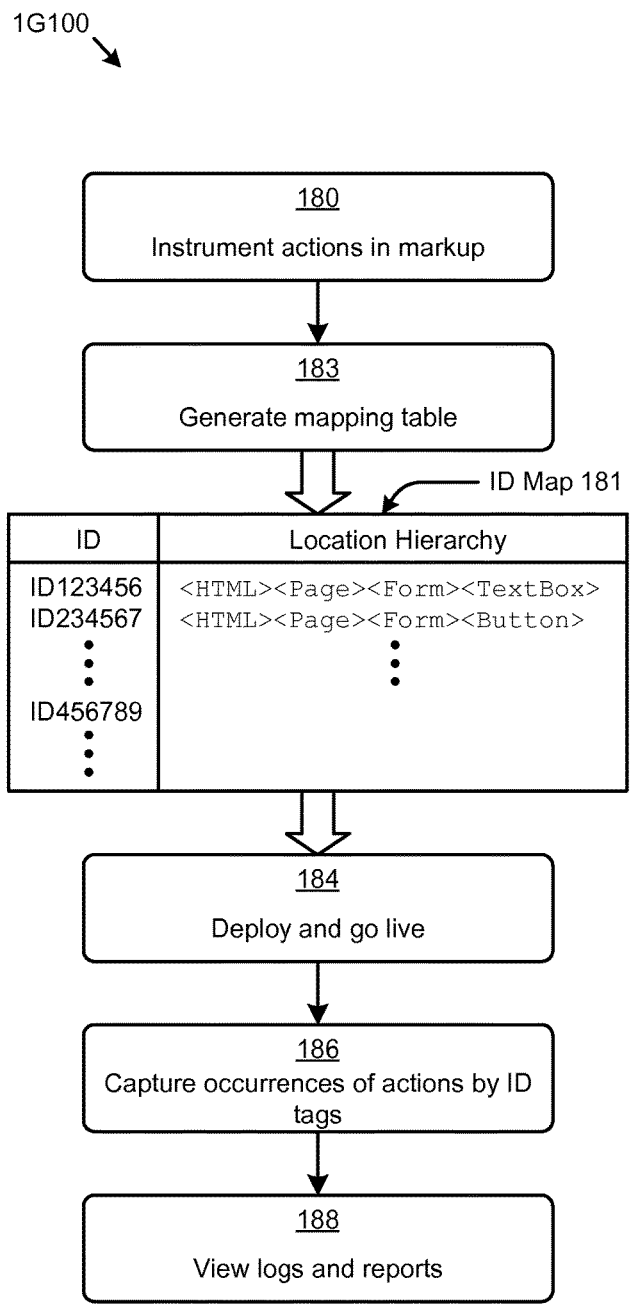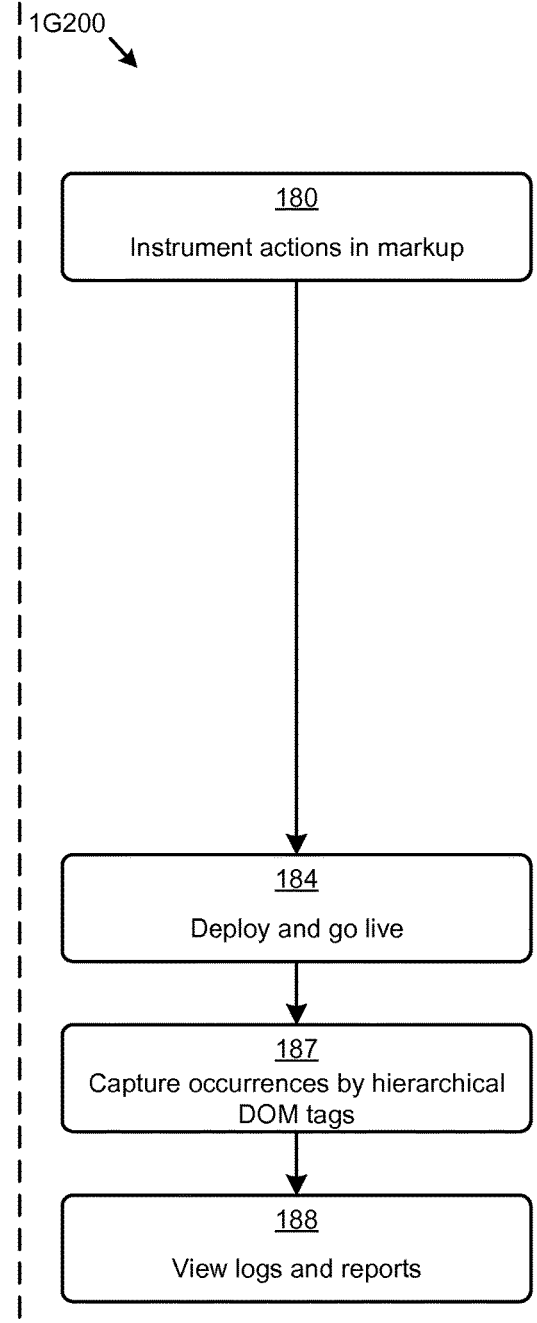
FIG. 1G1　　　FIG. 1G2

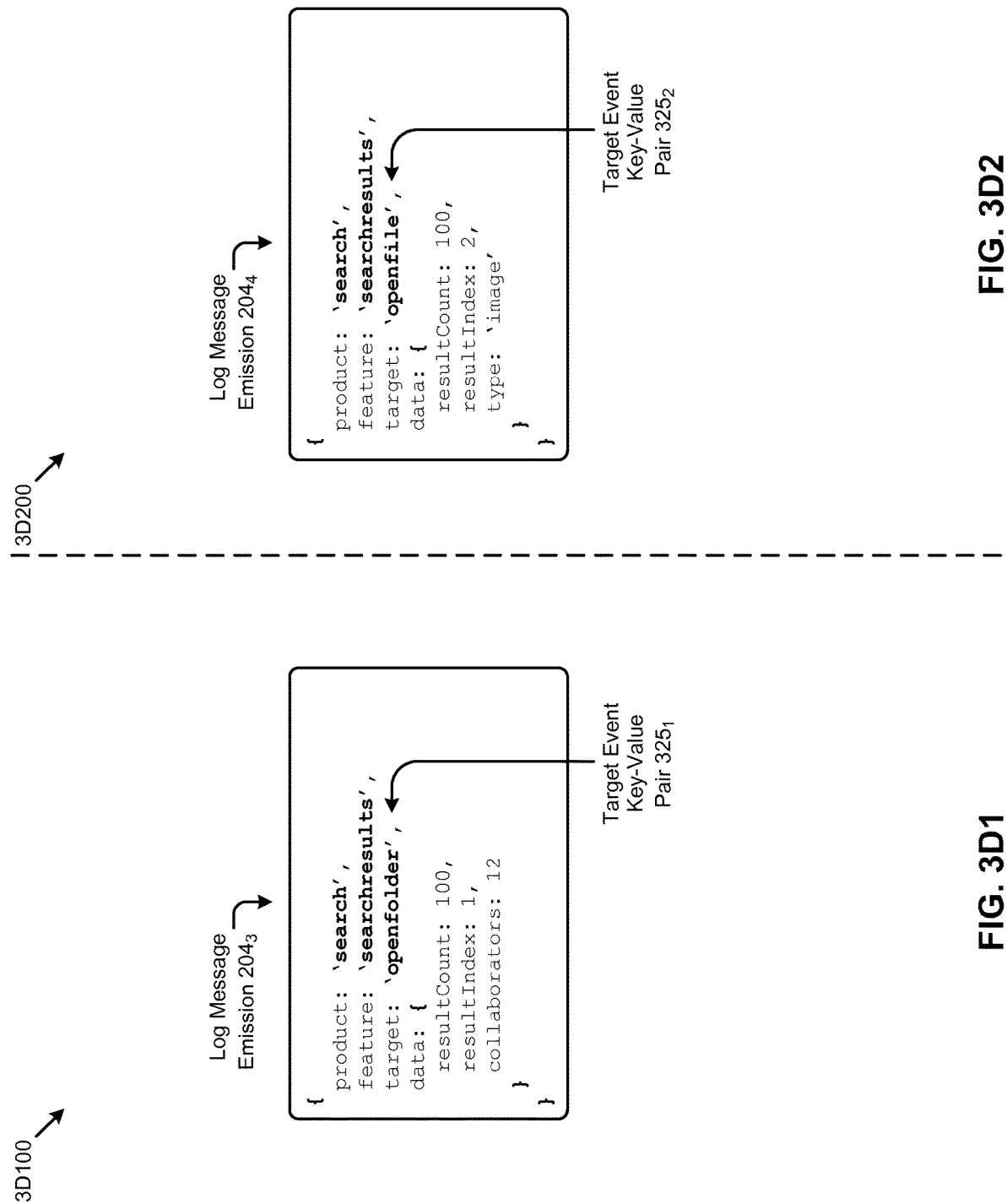

DYNAMIC GENERATION OF INSTRUMENTATION LOCATORS FROM A DOCUMENT OBJECT MODEL

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This disclosure relates to web page instrumentation, and more particularly to techniques for dynamic generation of instrumentation locators from a document object model.

BACKGROUND

Web application designers often want to track how users interact with deployed interfaces in their web applications. For example, a web application designer might want to know "what features are used most frequently", or "what navigation paths are most frequently traversed", or "how often does a user begin to use the application but then quits before receiving results". Markup languages used in web application user interfaces often include structural constructions (e.g., named HTML elements) and support for behaviors (e.g., scripts) that facilitate inclusion of instruments into the web pages. For example, a button (e.g., a "submit" button) can be associated with an observation and logging behavior (e.g., send a log message when the user presses the "submit" button).

Unfortunately, legacy techniques for including such observation and logging instruments (e.g., code) into web pages rely on location identifiers that are hard-coded with respect to the web page structure or are hard-coded with respect to an ad hoc data structure (e.g., a dictionary). Such hard-coded location identifiers are used to report (e.g., via emitted log messages) whatever action was taken by the user as pertaining to the web page element (e.g., "submit" button) that corresponds to the hard-coded location identifiers. Techniques involving hard-coding (e.g., hard coding an identifier in the form of a statically-determined URL) fail to provide needed capabilities, at least inasmuch as such statically-determined IDs become out of date when updated versions of the web page or web application are deployed. For example, if a button or widget is moved from one location in a web page to another location in the web page, the location identifier based on the original location would remain hard-coded in the containing web page, thus making the statically-determined original location identifier wrong. Some legacy techniques attempt to ameliorate the problem of keeping instrumentation locators up-to-date with deployed web pages by traversing a document object model and merely concatenating all of the names of the classes between the target element and the root document node, and then using that concatenation of classes as a unique identifier. Unfortunately, this legacy technique is deficient at least in that any change to the traversed hierarchy (e.g., changing a class name) would cause the target element to generate a new event identifier—and that new event identifier would not match the previous identifier used for the same class or element being tracked.

What is needed is a technique or techniques to improve over such legacy approaches.

SUMMARY

The present disclosure provides a detailed description of techniques used in systems, methods, and in computer program products for dynamic generation of instrumentation locator IDs from a document object model.

The present disclosure provides systems, methods, and computer program products suited to address the aforementioned issues with legacy approaches. More specifically, the present disclosure provides a detailed description of techniques used in systems, methods, and in computer program products for dynamic generation of instrumentation locator IDs from a document object model. Certain embodiments are directed to technological solutions for a way to deploy an instrumented web page or web application to include code that dynamically generates instrumentation identifiers using hierarchical location IDs derived from the document object model of the deployed user interface. The herein-disclosed techniques provide technical solutions that address the technical problems attendant to tracking user actions taken over web pages that rely on statically-determined location identifiers. Some embodiments disclosed herein use techniques to improve the functioning of multiple systems within the disclosed environments, and some embodiments advance peripheral technical fields as well.

Embodiments process a computer-readable user interface description comprising at least some markup language conforming to a respective document object model that is codified in a computer-readable language. An injector modifies the user interface description by inserting markup text and code into the user interface description, where the inserted code includes instrumentation code to invoke generation of instrumentation locator IDs using the hierarchical elements found in the document object model. The modified computer-readable interface description is transmitted to a user device. Log messages are emitted upon user actions taken while using the user device. The log messages comprise the instrumentation locator IDs and/or action occurrence IDs.

Further details of aspects, objectives, and advantages of the technological embodiments are described herein in the following descriptions, drawings, and claims.

BRIEF DESCRIPTION OF THE DRAWINGS

The drawings described below are for illustration purposes only. The drawings are not intended to limit the scope of the present disclosure.

FIG. 1F1 presents an HTML document having a text box screen device and a button screen device to be tracked using instrumentation locator IDs.

FIG. 1F2 presents an HTML document having a hierarchy of multiple components to be tracked using instrumentation locator IDs.

FIG. 1G1 presents a technique for tracking screen device usage by emitting log messages containing statically-generated instrumentation locator IDs.

FIG. 1G2 presents a flow for tracking screen device usage by emitting log messages containing dynamically-generated instrumentation locator IDs based on a document object model, according to an embodiment.

FIG. 2 depicts a log message emission flow that uses a document object model parser to form dynamically-generated instrumentation locator IDs, according to some embodiments.

FIG. 3D1 and FIG. 3D2 present user action log messages, according to some embodiments.

DETAILED DESCRIPTION

Figure 1A:
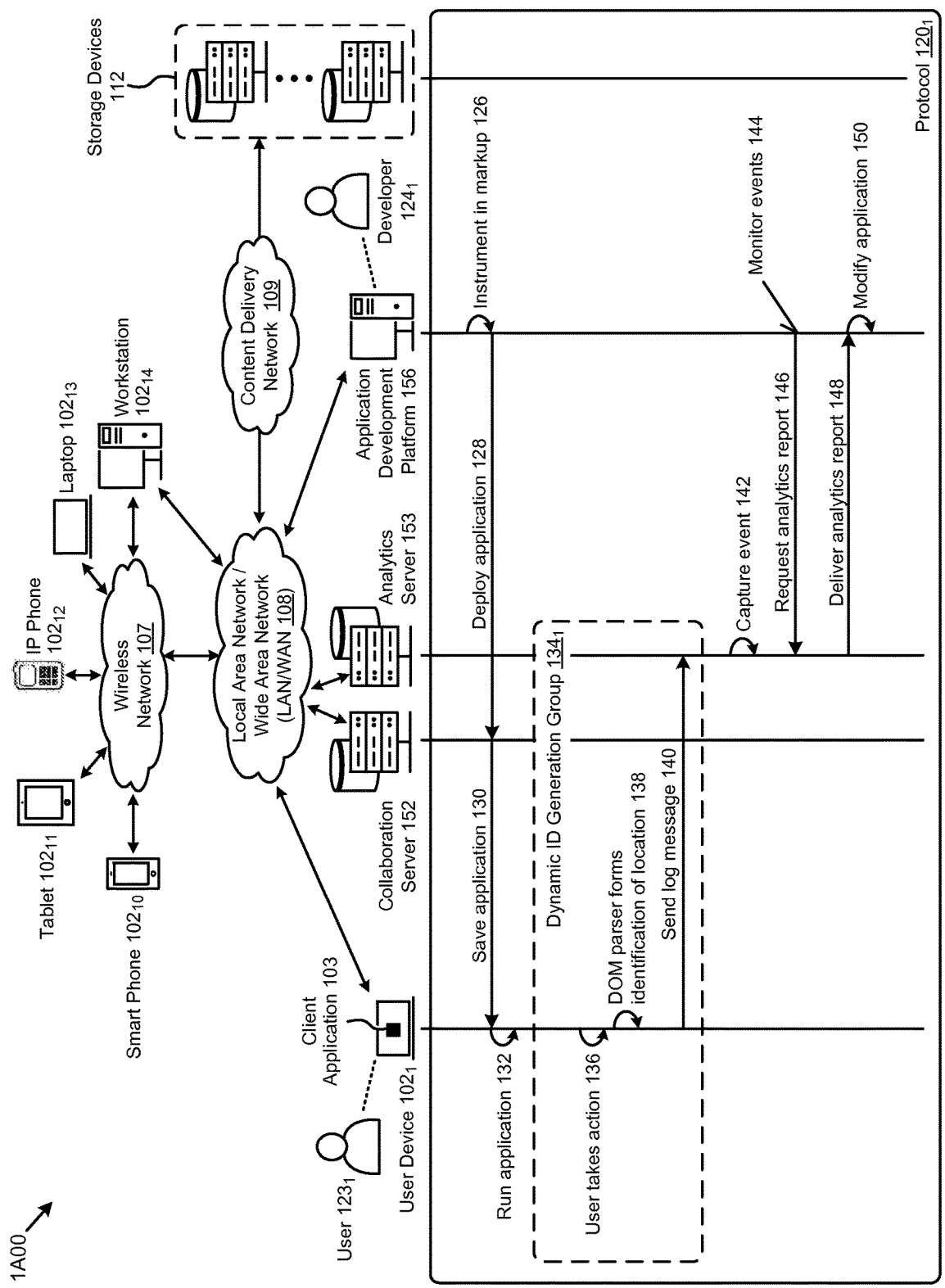
FIG. 1A depicts a computing environment having components that operate cooperatively to implement dynamic generation of instrumentation locator IDs from a document object model, according to an embodiment.

Embodiments are directed to approaches for a way to deploy an instrumented web page or web application to include code that dynamically generates instrumentation identifiers using hierarchical location IDs derived from the document object model of the deployed user interface. More particularly, disclosed herein and in the accompanying figures are exemplary environments, systems, methods, and computer program products for instrumenting web pages that include dynamically-generated instrumentation locator IDs.

OVERVIEW

Web pages used in web applications comprise user interface elements that are coded using markup languages (e.g., HTML, XML, xHTML, etc.) and a scripting language (e.g., JavaScript, Java plug-ins, etc.). Documents using such markup languages can be parsed by a computer to verify its syntax and semantics (e.g., to be well-formed and valid) using a document object model. As web pages change (e.g., due to revisions and redeployments) the document object model also changes in synchronicity. Techniques below describe how to use the document object model to generate location identifiers dynamically such that the dynamically-generated location identifiers are always in sync with the respective web page or pages.

Object models facilitate computer processing of documents, at least in that an object model codifies syntax, structure and semantics using concepts such as class, function, message, inheritance, polymorphism and encapsulation. Object models can be formed using any syntax or sub-language such as a schema language. One specific manifestation of an object model is a document object model (DOM). A DOM is delivered as a cross-platform and language-independent codification (e.g., file) to represent objects in HTML, XHTML, and XML documents. The nodes of document are organized in a hierarchical tree structure, called a document object model (DOM) tree. Objects in the DOM tree may be addressed and manipulated by using methods on the objects. In some cases, the interface of a DOM is specified in a set of application programming interface calls, which allow programs and scripts to dynamically access and update the content, structure and style of objects corresponding to the DOM.

Various embodiments are described herein with reference to the figures. It should be noted that the figures are not necessarily drawn to scale and that elements of similar structure or function are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, reference throughout this specification to "some embodiments" or "other embodiments" refers to a particular feature, structure, material, or characteristic described in connection with the embodiments as being included in at least one embodiment. Thus, the appearances of the phrase "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A depicts a computing environment 1A00 having components that operate cooperatively to implement dynamic generation of instrumentation locator IDs from a document object model.

FIG. 1A depicts a protocol $120_1$ for using analytics in a cloud-based collaboration environment. The group of messages and operations shown as dynamic ID generation group $134_1$ includes a portion of a protocol to implement analytics using client-side instrumentation. As shown, a user takes action on a user device $102_1$, and an object model parser determines an identifier for the location in the user interface code corresponding to the user's action. The determined identifier is included in a message that is sent to an analytics server.

More specifically, and as shown, a user $123_1$ interacts with a web application (see operation 136). The action invokes the aforementioned DOM parser, which returns at least an identifier that represents where in the user interface code the user interaction had taken place (see operation 138). The dynamically-determined identifier is used in a log message (see message 140).

The aforementioned group of operations and messages that is depicted as the dynamic ID generation group $134_1$ of protocol $120_1$ can be repeated any number of times as the user interacts with the application. The log message can be sent to the analytics server 153, or can be sent to any other computing element. In certain environments, and as shown in FIG. 1A, the ecosystem comprises various computing systems (e.g., servers and devices) interconnected by a wireless network 107, a network 108, and a content delivery network 109. The wireless network 107, the network 108, and the content delivery network 109 can comprise any combination of a wide area network (e.g., WAN), local area network (e.g., LAN), cellular network, wireless LAN (e.g., WLAN), or any such means for enabling communication of computing systems. The wireless network 107, the network 108, and the content delivery network 109 can also collectively be referred to as the Internet. The content delivery network 109 can comprise any combination of a public network and a private network.

As shown, the computing environment 1A00 comprises at least one instance of the collaboration server 152, at least one instance of the analytics server 153, at least one instance of an application development platform 156, and a plurality of storage devices 112. The servers and storage devices shown in computing environment 1A00 can represent any single computing system with dedicated hardware and software, multiple computing systems clustered together (e.g., a server farm, a host farm, etc.), a portion of shared resources on one or more computing systems (e.g., a virtual server), and/or any combination thereof. For example, the collaboration server 152 and the storage devices 112 can comprise a cloud-based content management platform that provides shared content management and storage services.

The computing environment 1A00 further comprises instances of user devices (e.g., user device $102_1$) that can represent one of a variety of other computing devices (e.g., a smart phone $102_{10}$, a tablet $102_{11}$, an IP phone $102_{12}$, a laptop $102_{13}$, a workstation $102_{14}$, etc.) having software (e.g., a client application 103, etc.) and hardware (e.g., a graphics processing unit, display, monitor, etc.) capable of processing and displaying information (e.g., web page, graphical user interface, etc.) on a display. The user device $102_1$ can communicate information (e.g., web page request, user activity, electronic files, etc.) over the wireless network 107, the network 108, and the content delivery network 109. As shown, the user device $102_1$ can be operated by a user collaborator such as user $123_1$. Also, the application development platform 156 can be operated by a collaborator such as developer $124_1$.

In one variation, the protocol $120_1$ for using analytics in a cloud-based collaboration environment includes development of a web page and/or web application (e.g., by developer $124_1$). The page or application is instrumented (see operation 126) and deployed (see message 128). In some cases, the application is deployed first to a collaboration server 152, which relays the application code to a user device (see message 130). The application is run on the user device (see operation 132) and the user interacts with the deployed application. The user's actions serve to invoke the group of messages and operations shown as dynamic ID generation group $134_1$. The analytics server can process the log messages so as to capture the user event or events (see operation 142). A developer or any other collaborator can asynchronously monitor the events (see asynchronous message 144), and can request an analytics report (see message 146). The analytics server responds to the request and delivers an analytics report (see message 148). The developer can interpret the analytics report, and possibly modify the application (see operation 150) in response to interpretation of the user's interactions with the web application.

User interactions can be captured based on any sort of user input or navigation. Strictly as an example, FIG. 1B presents a portion of a web page having tracked screen devices in the form of (1) a text box, and (2) an action button.

Figure 1B:
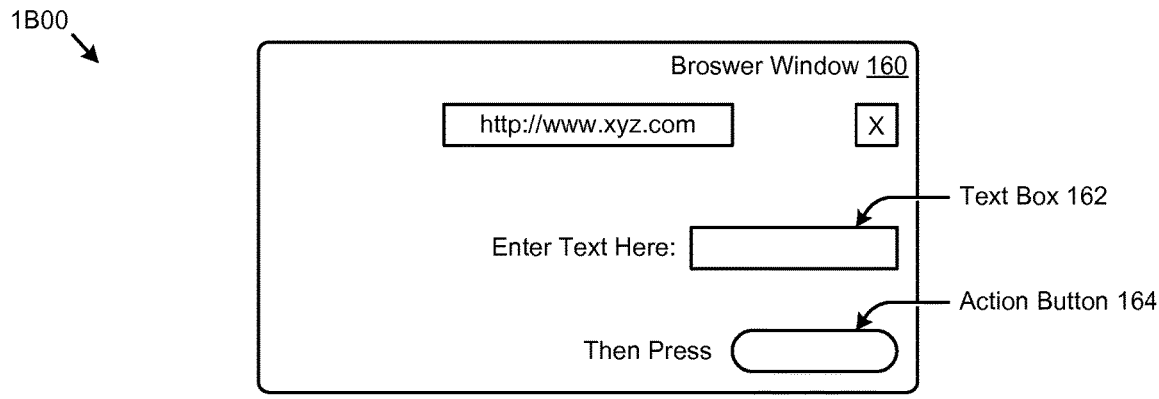
FIG. 1B depicts a portion of a web page having tracked screen devices that can be tagged with dynamically-generated instrumentation locator IDs based on a document object model, according to an embodiment.

FIG. 1B depicts a portion of a web page 1B00 having tracked screen devices that can be tagged with dynamically-generated instrumentation locator IDs based on a document object model. As an option, one or more variations of tracked screen devices or any aspect thereof may be implemented in the context of the architecture and functionality of the embodiments described herein. Also, the tracked screen devices or any aspect thereof may be implemented in any environment.

The shown portion of a web page 1B00 is depicted within a browser window 160, however tracked screen devices can be tracked within applications that do not rely on browser functions. For example, the shown tracked screen devices can be displayed within a web agent or a custom application or client-server app that uses a document object model. Some such browser alternatives include apps or application components that are native to the user device.

In this example, the developer desires to track user interaction with the shown text box 162 and the action button 164. The developer sets about to instrument the interface by inserting tracking code somewhere near the markup language comprising the element or elements for which user interaction is to be tracked. One possibility is to use statically-determined identifier locations (e.g., so the developer can know that the user typed something into the text box and/or that the user pressed the action button, etc.). Another possibility is to use dynamically-determined identifier locations (e.g., using a document object model) where the dynamically-determined identifier locations do not change merely because a class name or element name has changed.

Figure 1C:
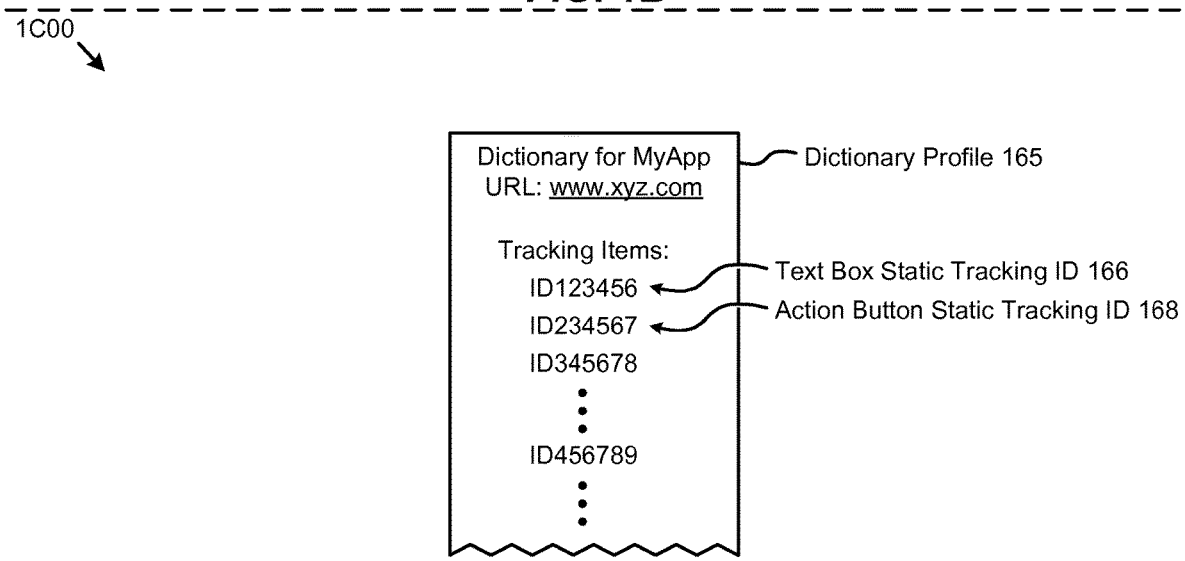
FIG. 1C and FIG. 1D depict one possible usage of statically-defined tracking item identifiers.
Figure 1D:
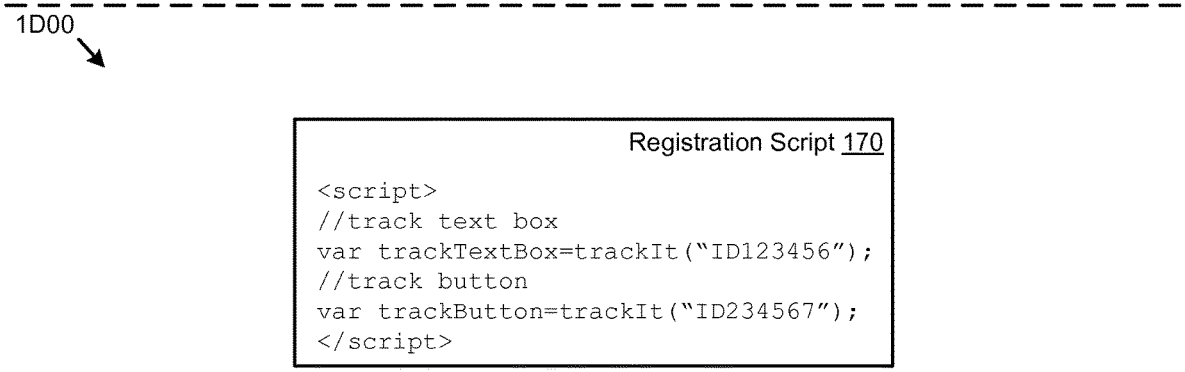

FIG. 1C and FIG. 1D depict one possible usage of a dictionary 1C00 comprising statically-defined tracking item identifiers and one possible usage of a script 1D00 comprising statically-defined tracking item identifier parameters.

The embodiments shown in FIG. 1C and FIG. 1D are merely example uses of statically-defined tracking item identifiers. As shown, the dictionary comprises static tracking IDs, specifically a text box static tracking ID 166 and an action button static tracking ID 168. These IDs are determined by the developer and added into a dictionary profile 165 (as shown) or other data item. The static tracking IDs can be used as handles or parameters, as is shown and discussed as pertaining to FIG. 1E. Specifically, and as shown, the script of FIG. 1D defines variables:

"var trackTextBox=trackIt("ID123456")" and another variable,

"var trackButton=trackIt("ID234567")", both of which use the text box static tracking ID 166 and the action button static tracking ID 168 as parameters to the function "trackIt".

When the registration script 170 executes (e.g., in a browser) the text box static tracking ID 166 and the action button static tracking ID 168 are set to be emitted (e.g., in a log message) when there is interaction with the respective text box and respective action button. Log messages can be collected (e.g., by an analytics server 153) and reports such as the report depicted in FIG. 1E can be generated.

Figure 1E:
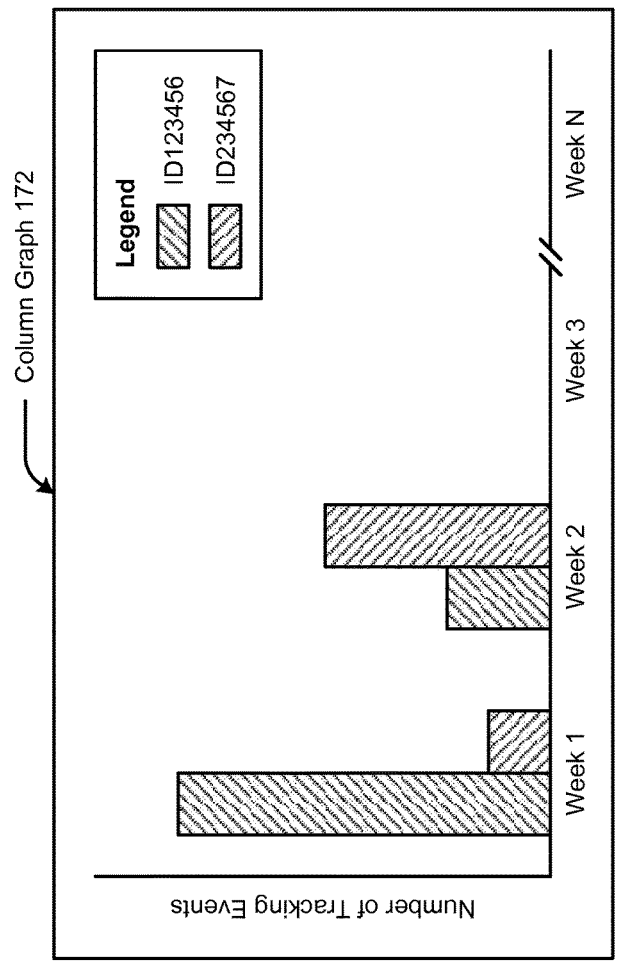
FIG. 1E depicts a tracking report stack chart that shows occurrences of tracking events using instrumentation locator IDs.

FIG. 1E depicts a tracking report stack chart 1E00 that shows occurrences of tracking events using instrumentation locator IDs. As an option, one or more variations of tracking report stack chart 1E00 or any aspect thereof may be implemented in the context of the architecture and functionality of the embodiments described herein. Also, the tracking report stack chart 1E00 or any aspect thereof may be implemented in any environment.

The embodiment shown in FIG. 1E include a column graph 172, which is merely one example of a tracking report. Referring to the example of FIG. 1C and FIG. 1D, the occurrences of user interaction events are tracked (e.g., by an analytics server 153) and, upon a request (e.g., see message 146 to request an analytics report), a report is generated. As shown, the number of tracking events for ID123456 is high in the first week, and declines dramatically in the second week. Additionally, as shown, the number of tracking events for ID234567 is low in the first week, and increases dramatically in the second week.

FIG. 1F1 presents an HTML document 1F100 having a text box screen device and a button screen device to be tracked using instrumentation locator IDs. As an option, one or more variations of HTML document 1F100 or any aspect thereof may be implemented in the context of the architecture and functionality of the embodiments described herein. Also, the HTML document 1F100 or any aspect thereof may be implemented in any environment.

The embodiment shown in FIG. 1F1 is merely one example showing a hierarchy of HTML elements (see DOM schematic representation 174). The hierarchy includes an HTML document code (e.g., see tag "<HTML>"), a page element (e.g., see tag "<PAGE>"), a form element (e.g., see tag "<FORM>"), a text area element (e.g., see tag "<Textarea>"), and a button element (e.g., see tag "<button>").

Figure 2:
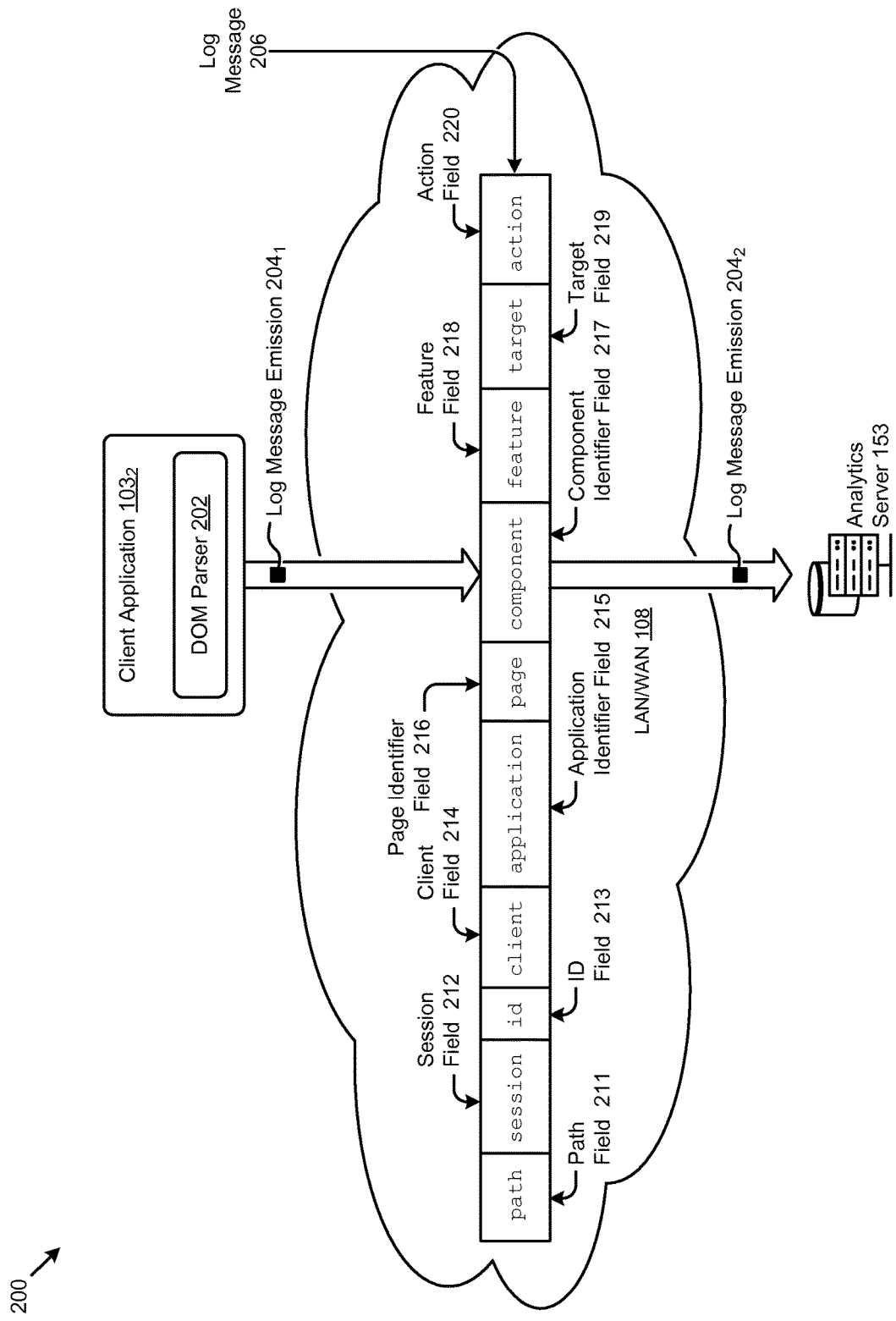

FIG. 1F2 presents an HTML document 1F200 having a hierarchy of multiple components to be tracked using instrumentation locator IDs. As an option, one or more variations of HTML document 1F200 or any aspect thereof may be implemented in the context of the architecture and functionality of the embodiments described herein. Also, the HTML document 1F200 or any aspect thereof may be implemented in any environment.

As shown, the hierarchy of multiple components comprises the hierarchies named <HTML>, <body>, , <header>, <div>, <content>, <commentform>, <textarea>, <submitbutton>, as well as components named <sidebar>, and <footer>.

In accordance with naming rules discussed herein, the dynamically-generated names (e.g., names or other identifiers to refer to a specific instance of an instrument or a specific logging event) are only dependent on an order of a hierarchical path rather than on names of classes. This allows for extensive changes to the document and document structure without affecting names or other identifiers used to refer to specific instances of instruments or without affecting names or other identifiers used to refer to a specific logging event.

Variations in processing steps depending on use of statically-generated instrumentation locator IDs as compared to use of dynamically-generated instrumentation locator IDs are shown and discussed as pertaining to FIG. 1G1 and FIG. 1G2, respectively.

FIG. 1G1 presents a technique 1G100 for tracking screen device usage by emitting log messages containing statically-generated instrumentation locator IDs. As an option, one or more variations of technique 1G100 or any aspect thereof may be implemented in the context of the architecture and functionality of the embodiments described herein. Also, the technique 1G100 or any aspect thereof may be implemented in any environment.

The flow of FIG. 1G1 commences at step 180. Instruments (e.g., code to emit log messages) are inserted into the document as markup (e.g., in a markup language such as the hypertext markup language). For example, a web page or series of web pages (e.g., in a web application) are considered for instrumentation. The inserted instruments are collected into an ID map 181 (see step 183). The web page or pages and/or web application is deployed (see step 184) in a go-live event. When a user invokes viewing of the web page or pages, the markup language is rendered. If there are tracking IDs that were registered for tracking (e.g., see registration script 170), then user interaction with the web page or pages are captured by the instruments (see step 186), and log messages are emitted. Log messages and/or reports responsive to log messages can then be viewed (see step 188).

Such statically-determined IDs can become out of date when updated versions of the web pages and/or web applications are deployed. For example, if the text area or action button or other instrumented widget is moved from one location in a web page to another location in the web page, the location identifier based on the original location would remain statically hard-coded in the containing web page, making the statically-determined original location identifier become inaccurate or wrong. A flow for dynamically-generating instrumentation locator IDs is given in the following FIG. 1G2.

FIG. 1G2 presents a flow 1G200 for tracking screen device usage by emitting log messages containing dynamically-generated instrumentation locator IDs based on a document object model. As an option, one or more variations of flow 1G200 or any aspect thereof may be implemented in the context of the architecture and functionality of the embodiments described herein. Also, the flow 1G200 or any aspect thereof may be implemented in any environment.

The flow of FIG. 1G2 also commences at step 180. Instruments (e.g., code to emit log messages) are inserted into the document as markup (e.g., in a markup language such as the hypertext markup language). However, the embodiment shown in FIG. 1G2 does not need to generate a mapping table (see step 183 of FIG. 1G1) and no ID map data item is needed. Rather, upon a deployment and go-live event (see step 184), operations to capture occurrences of user interaction events (see step 187) is invoked, and log messages that refer to hierarchical DOM tags are emitted. The DOM tags are generated dynamically, based on the document object model of the document being rendered. Log messages and/or reports responsive to log messages can then be viewed (see step 188).

In some cases, a listing of the hierarchical DOM tags that are emitted can be provided to an agent. For example, an instance of an analytics server 153 might provide the agent with a set of locations in the form of a set of unique hierarchical DOM tags. The agent can process the set of unique hierarchical DOM tags to identify areas in the user interface where there is evidence of usage (or non-usage) in a particular area of the user interface. In some cases, hierarchical DOM tags can be generated on the client-side (e.g., by a client application) using a document object model data item. Such a scenario is shown and described as pertaining to the log message emission flow of FIG. 2.

FIG. 2 depicts a log message emission flow 200 that uses a document object model parser to form dynamically-generated instrumentation locator IDs. As an option, one or more variations of log message emission flow 200 or any aspect thereof may be implemented in the context of the architecture and functionality of the embodiments described herein. Also, the log message emission flow 200 or any aspect thereof may be implemented in any environment.

A user interacts with a client application $103_2$, and in the course of so doing, one or more instrumented widgets are the subject of a user touch (e.g., a click, or a keypress, or a hover, or a pull-down, or a multi-touch, or a change, etc.). In this embodiment, when an instrumented widget is touched or otherwise is the subject of interaction by a user, the instrument emits a message (e.g., see log message 206) to be transmitted over a network (e.g., LAN/WAN 108) to a server such as an analytics server 153 (see log message emission $204_1$ and log message emission $204_2$). Aspects of the message and contents thereto are determined by the specific instrument. In some cases, the message is in the format shown as log message 206. Specifically, the message can comprise a path field 211 (e.g., possibly a URI or URL), a session field 212 (e.g., a session ID as may be managed by a collaboration server), an ID field 213 (e.g., a dynamically-generated unique ID that is generated for a particular action instance), a client field 214 (e.g., identifying information as to the client device and software running on the client device), an application identifier field 215, a page identifier field 216, a component identifier field 217 (e.g., what screen device or widget), a feature field 218, a target field 219, and an action field 220. Using the aforementioned aspects of the message and contents thereto (e.g., path, session, ID, action instance, etc.) user activity can be monitored at a very granular level. Aspects of the log messages can be determined (e.g., generated) by the client. In some cases, some portions of a message that originates from a client can be modified by a receiver module running on a server. As such, a client can emit a log message that is received by a collaboration server 152, and the collaboration server can augment the log message to further characterize how users interact with deployed web pages or applications. Strictly as one example, collaboration server 152 might receive a logging message that was emitted by a client, and then relate that message to other activities or data accessible by the collaboration server. Some such activities or data accessible by the collaboration server include (1) information pertaining to which other users have accessed the same object, (2) information pertaining to which other users are currently accessing the same object, and/or (3) information pertaining to any role or other user characteristic or profile information pertaining to any users. In an example case, two collaborators interact over respective two instances of the same workspace using the same user interface. In one case, a first collaborator uses (for example) a button to indicate a submit operation. In another case, a second collaborator uses a link to indicate a submit operation. Both events are logged (e.g., using collaborator-specific emissions of log message 206), and can be processed by collaboration server 152 or analytics server 153, or both. Given a statistically significant number of log emissions, the preferences of one user as compared to another user (or one user role over another user role) can be quantified. User interface characteristics that are deemed to be not preferred might be superseded by user interface characteristics that are deemed to be preferred.

The shown DOM parser can provide values for some or all of the aforementioned fields. In particular, the DOM parser 202 can return values corresponding to any one or more of a set of tags that can appear in a document object model. In some cases a portion of such a document object model can be organized into a hierarchy, possibly in accordance with a set of hierarchical rules and/or conventions, as is shown and discussed as pertaining to the following figures.

Figure 3A:
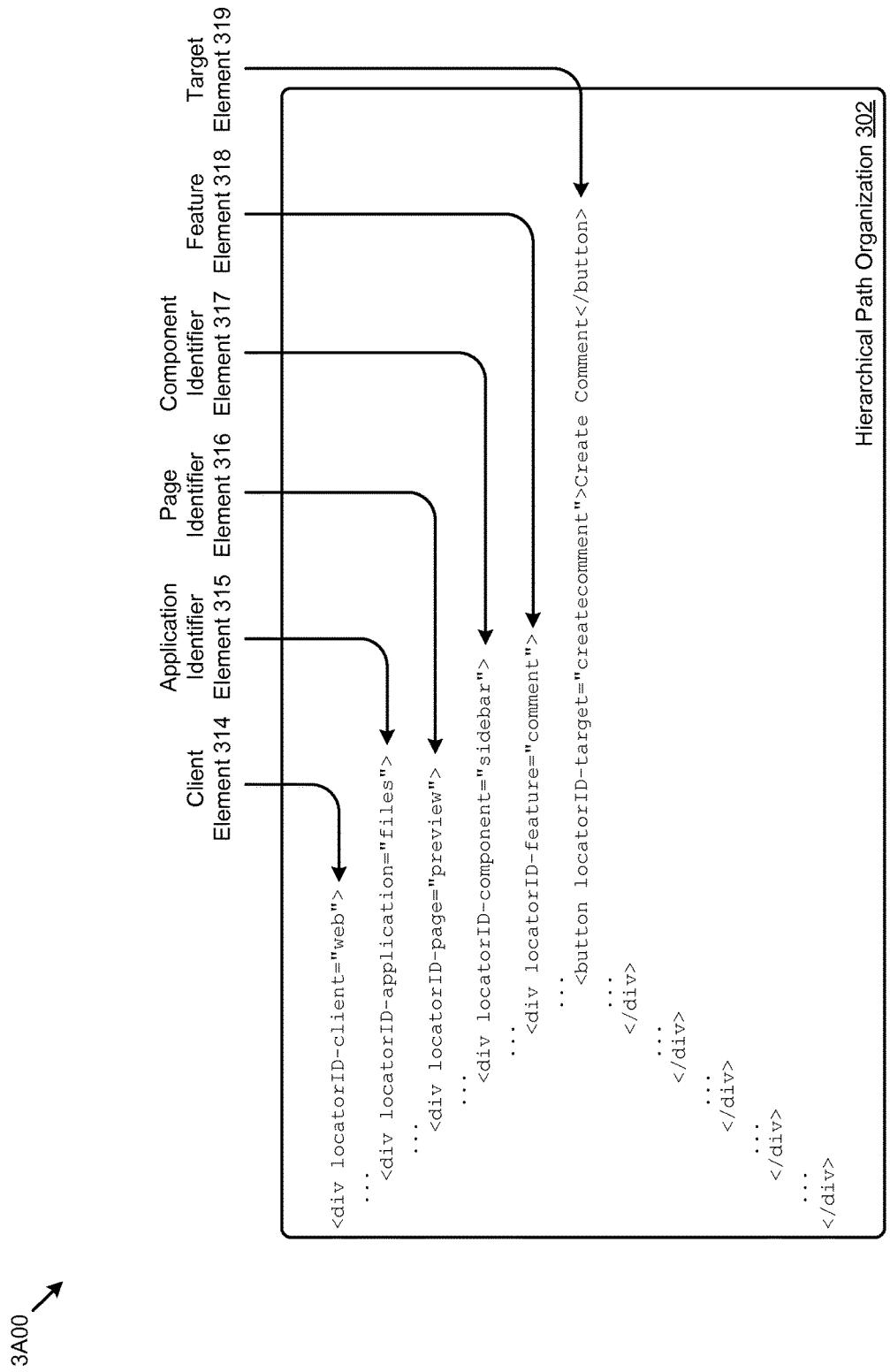
FIG. 3A presents a code segment from a markup language that conforms to a hierarchical organization convention 3A00 used in web pages that use dynamically-generated instrumentation locator IDs based on a document object model, according to an embodiment.

FIG. 3A presents a code segment from a markup language that conforms to a hierarchical organization convention 3A00 used in web pages that use dynamically-generated instrumentation locator IDs based on a document object model. As an option, one or more variations of hierarchical organization convention 3A00 or any aspect thereof may be implemented in the context of the architecture and functionality of the embodiments described herein. Also, the hierarchical organization convention 3A00 or any aspect thereof may be implemented in any environment.

The code segment shown in the hierarchical path organization 302 is merely one example of an assembly of hierarchical component names that conforms to a set of hierarchical naming rules and/or hierarchical components or conventions. Specifically, the shown hierarchy comprises markup language elements and key-value pairs to codify a client element 314 (e.g., wherein one or more name-value pairs includes identifying information as pertaining to the client device and/or software running on the client device), an application identifier element 315 (e.g., wherein one or more name-value pairs describes an application), a page identifier element 316 (e.g., wherein one or more name-value pairs describes an application), a component identifier element 317 (e.g., wherein one or more name-value pairs describes a screen area or screen device or widget), a feature element 318 (e.g., wherein one or more name-value pairs describes a feature name or characteristic), and a target element 319 (e.g., wherein one or more name-value pairs describes a screen area or screen device or widget). Also pertinent to web pages that use dynamically-generated instrumentation locator IDs is an action element. In some embodiments, an action element is defined so as to codify occurrences of user interactions with the target instrument. It can be defined by the event fired in JavaScript when the user interacts with the target instrument. For example, a click on the button can generate a 'click' action and a touch can generate a 'touch' action.

In the example of FIG. 3A, the log as emitted by the occurrence of the event of pressing the shown button might comprise content such as is depicted in Table 1.

TABLE 1

| Ref | Information |
|---|---|
| | Log contents |
| 1 | path: /preview/12345, |
| 2 | session: ak3mfm213mdks9482nnd, |
| 3 | id: 84odgj5530glskv8so3nsf, |
| 4 | client: 'web', |
| 5 | application: 'files', |
| 6 | page: 'preview', |
| 7 | component: 'sidebar', |
| 8 | feature: 'comment', |
| 9 | target: 'createcomment', |
| 10 | action: 'click', |

Using action elements, a web page developer is able to define a mapping from the native event (e.g., an event fired by JavaScript) to a developer-defined action name. Strictly as one example, a "keydown" event could be mapped to, and logged as, "keyboardbuttonpress".

In some cases dynamically-generated instrumentation locator IDs are present in content that is itself dynamically generated. For example, a content management system (CMS) can generate content (e.g., search results) in response to a user request (e.g., a request for a search to be performed over a user-entered search term). While the extent of such results (e.g., how many hits) might not be known until after processing the request for search over the search term, a CMS system can present the returned results in an a priori known format. Such a format is described as pertaining to FIG. 3B.

Figure 3B:
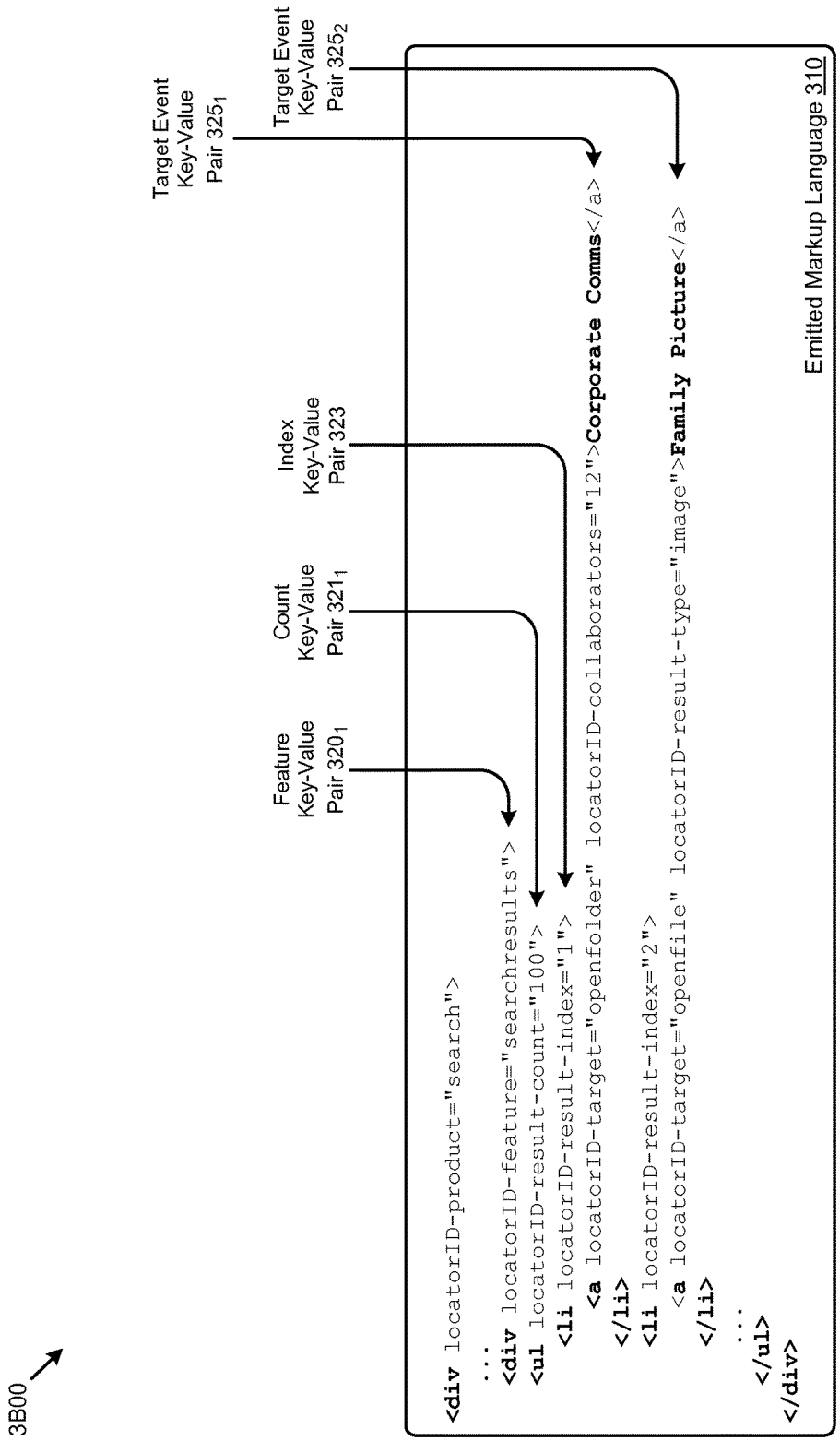
FIG. 3B presents dynamically-generated content 3B00 as depicted in the form of markup language emitted from a content management system, according to an embodiment.

FIG. 3B presents dynamically-generated content 3B00 as depicted in the form of markup language emitted from a content management system (e.g., see emitted markup language 310). The markup includes dynamically-generated instrumentation locator IDs based on a template. As an option, one or more variations of the dynamically-generated content 3B00 or any aspect thereof may be implemented in the context of the architecture and functionality of the embodiments described herein. Also, the dynamically-generated content 3B00 or any aspect thereof may be implemented in any environment.

As shown, the dynamically-generated content 3B00 includes multiple list items (e.g., see instances of markup element "<li>"). In this example, the instrumentation code is embedded in and around the list items. Specifically, the instrumentation that is embedded in the dynamically-generated content includes locator IDs, various instances of which incorporate a feature key-value pair $320_1$, a count key-value pair $321_1$, an index key-value pair 323, a first instance of a target event key-value pair $325_1$, and another instance of a target event key-value pair $325_2$. In this example, the number of result elements (e.g., list elements) is given as "100" (see count key-value pair $321_1$), and each list element in the result set is given an index (e.g., "1" "2", etc.).

Instrumented results such as dynamically-generated content 3B00 can be generated by a content management system or any operational block that can generate content. To facilitate consistency in such results, an instrumentation format template can be provided to the content management system.

Figure 3C:
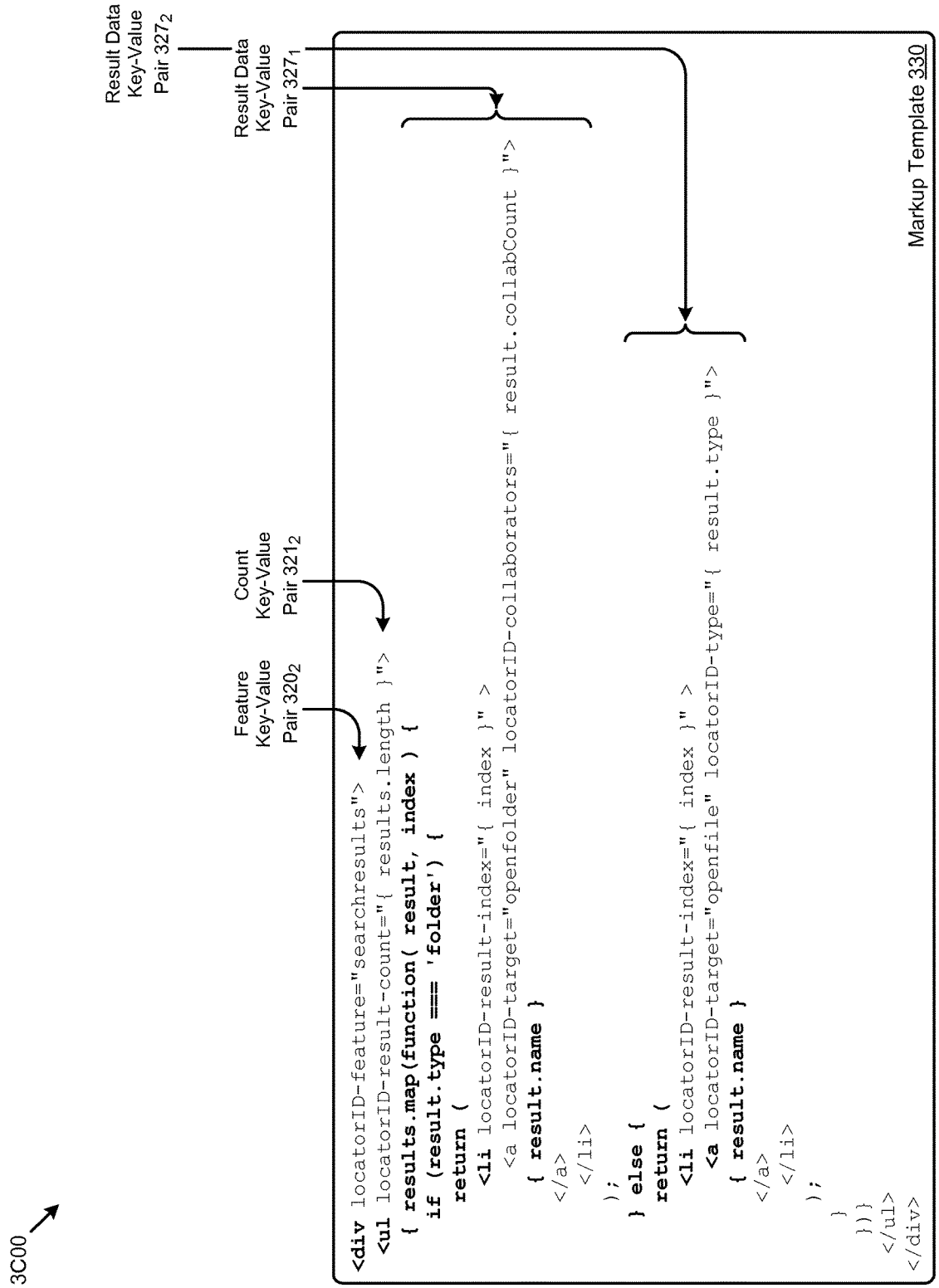
FIG. 3C depicts an instrumentation format template 3C00. The template defines the format for dynamically-generated instrumentation locator IDs based on a template, according to an embodiment.

FIG. 3C depicts an instrumentation format template 3C00. The template defines the format for dynamically-generated instrumentation locator IDs based on a template. As an option, one or more variations of the instrumentation format template 3C00 or any aspect thereof may be implemented in the context of the architecture and functionality of the embodiments described herein. Also, the instrumentation format template 3C00 or any aspect thereof may be implemented in any environment.

The instrumentation format template (e.g., see the shown markup template 330) includes a feature key-value pair $320_2$, a count key-value pair $321_2$, and two instances of a result data key-value pair (e.g., result data key-value pair $327_1$ and result data key-value pair $327_2$). A CMS engine can process such an instrumentation format template during the course of preparing results to present to a user in response to a user's request. The dynamically-generated content 3B00 is an example of output that conforms to the instrumentation format template 3C00.

Any variations of dynamically-generated content that conforms to any variations of an instrumentation format template as heretofore-described can be rendered for presentation to a user. Such variations include template-based, dynamically-generated variations that are in conformance to a particular document object model. Continuing this example, when a web page that uses dynamically-generated instrumentation locator IDs (e.g., such as are embedded in conformance to any variations of the described instrumentation format) is rendered, log messages are emitted. Strictly as an example, following the disclosure of FIG. 3B and FIG. 3C, the log messages are emitted in a format as depicted in FIGS. 3D1 and 3D1.

FIG. 3D1 and FIG. 3D2 present a first user action log message 3D100 and a second user action log message markup 3D200, respectively. The log message emission $204_3$ pertains to an "openfolder" type of user action. The log message emission $204_4$ pertains to an "openfile" type of user action. Such log message emissions are generated by a generateId ( ) function. Emissions are received and processed by an analytics server 153.

Figure 4:
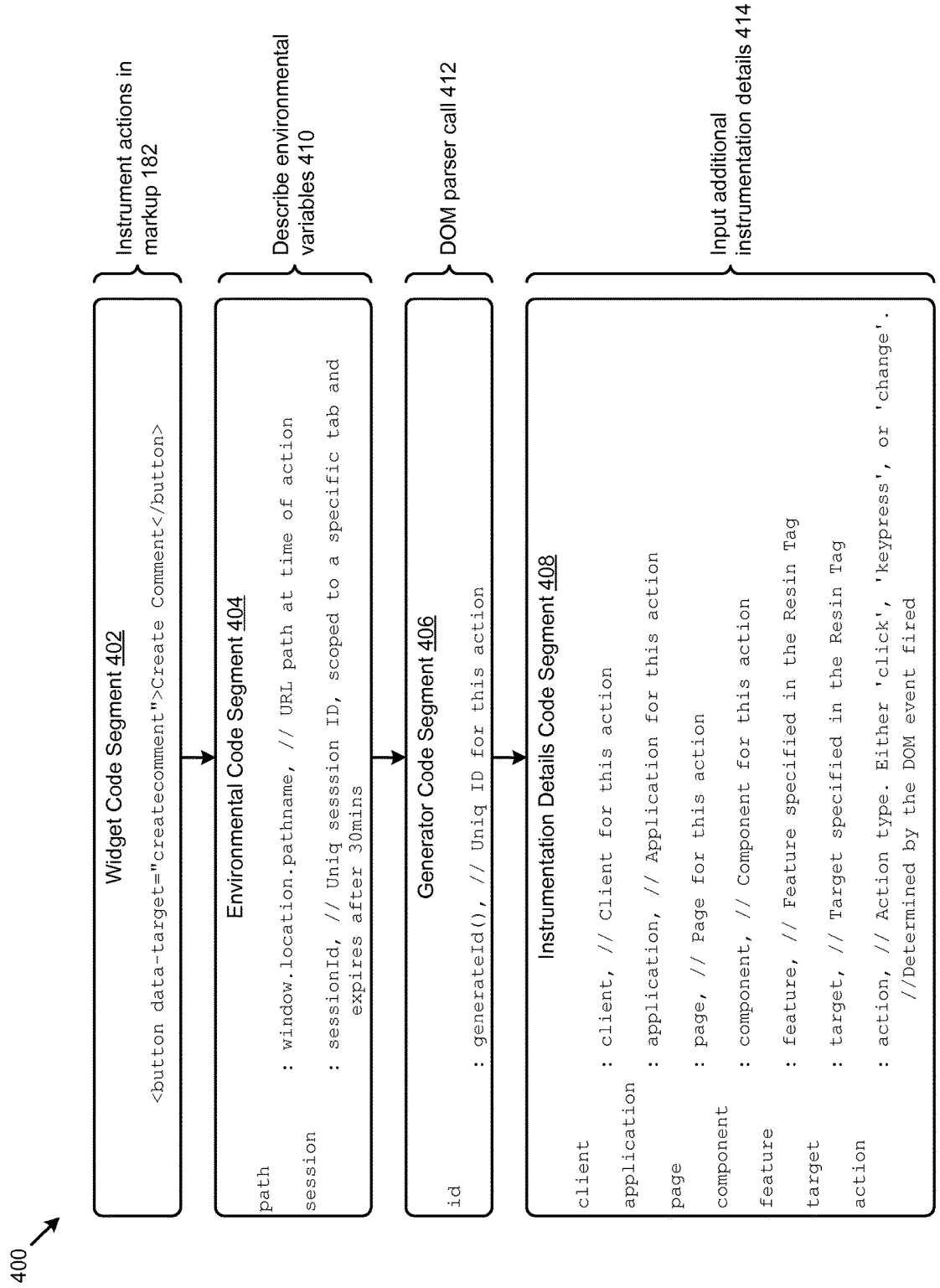
FIG. 4 exemplifies an instrumentation coding technique used for authoring web pages and/or web applications that implement dynamically-generated instrumentation locator IDs based on a document object model, according to an embodiment.

FIG. 4 exemplifies an instrumentation coding technique 400 used for authoring web pages and/or web applications that implement dynamically-generated instrumentation locator IDs based on a document object model. As an option, one or more variations of instrumentation coding technique 400 or any aspect thereof may be implemented in the context of the architecture and functionality of the embodiments described herein. Also, the instrumentation coding technique 400 or any aspect thereof may be implemented in any environment.

The code presented in FIG. 4 includes an instrumented widget code segment 402 (e.g., for instrument actions in markup 182, i.e., attaching an instrument to a particular widget), an environmental code segment 404 (e.g., for describing environmental variables 410), a generator code segment 406 (e.g., for invoking a generator function such as a DOM parser call 412), and an instrumentation details code segment 408 (e.g., that comprises inputting additional instrumentation details 414). Such instrumentation details can be determined or derived from the DOM path of the target instrument when an action occurs on a target element The generateId ( ) call as shown in the generator code segment can use any aspects of environment variables that can be determined at the time of the action. Portions of the generated ID may remain unchanging vis-à-vis then current environmental conditions, and other portions of the generated ID may change in relative synchrony with the environment changes. Moreover, the generate Id ( ) function can execute a call to the DOM parser. In some embodiments a call to the DOM parser can be invoked by a listener that is listening for particular JavaScript events. For example, if a user clicks anywhere in the user interface described by the DOM, client-side code can detect the occurrence of that click event and determine if it should parse the DOM path to generate an ID and log an event. In some cases the determination of an ID and the determination to log an event or not is based on whether or not the event target has a target field or other target attribute defined for it (e.g., see attributes as discussed pertaining to FIG. 2). In verbose cases (e.g., as might be used during development phases), the determination to log an event is permissive, and a message is logged upon the occurrence of the event, even if there is no event target or target field or other target attribute corresponding to the event.

Figure 5A:
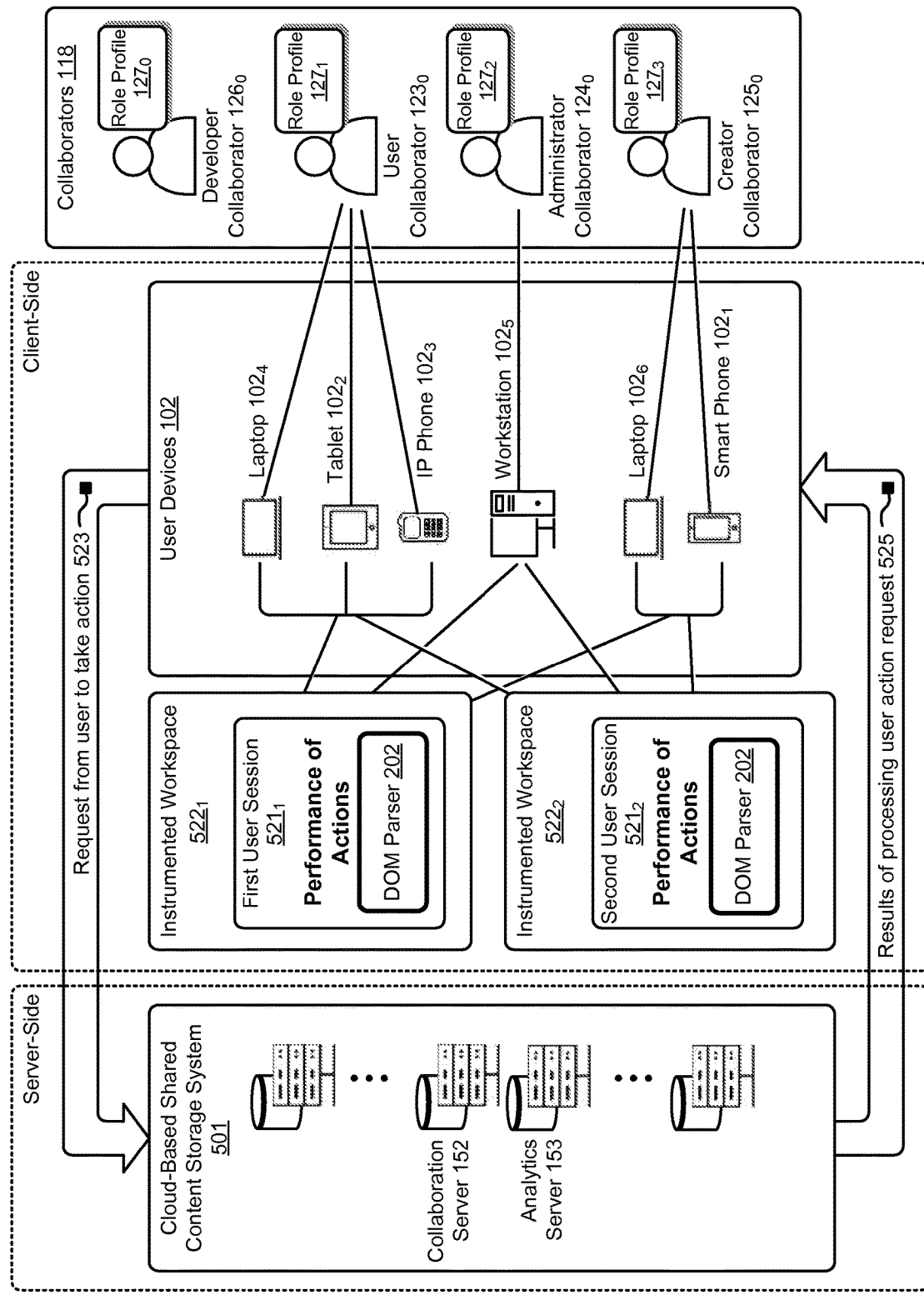
FIG. 5A depicts a deployment environment for hosting web pages and/or web applications that implement dynamically-generated instrumentation locator IDs based on a document object model, according to an embodiment.

FIG. 5A depicts a deployment environment for hosting web pages and/or web applications that implement dynamically-generated instrumentation locator IDs based on a document object model. As an option, one or more variations of deployment environment or any aspect thereof may be implemented in the context of the architecture and functionality of the embodiments described herein. Also, the deployment environment or any aspect thereof may be implemented in any environment.

The deployment environment implements a collaboration system that uses any number of instrumented workspaces (e.g., instrumented workspace $522_1$ and instrumented workspace $522_2$), any of which can monitor occurrences of user actions taken when a user is logged into a session (e.g., see first user session $521_1$, and second user session $521_2$) and interacting with instrumented code. Collaborative object sharing can take place concurrently with other accesses in multiple concurrent sessions involving multiple concurrently sharing users (e.g., collaborators 118) using multiple applications. Specifically, for example, a developer (e.g., a creator collaborator $125_O$) might deploy an application to be used by any collaborator, and the developer might want to measure how users interact with the application.

A user might interact with an application in predictable ways, or a user might interact with an application in unpredictable ways. In both cases a developer might want to measure how users interact with the application and/or users interact with dynamically-generated content generated during user interaction with the application. As in the discussion of FIG. 3A through FIG. 3C, a user can request some particular action while interacting with the application, and such a request (e.g., request from user to take action 523) can be delivered to a cloud-based shared content system. A collaboration server and/or a content management engine can process such a user request, and after preparing results to present to a user in response to the user's request, the collaboration server and/or a content management engine can deliver results to the requestor (e.g., see results of processing user action requests 525). Such results (e.g., that include dynamically-generated instrumentation locator IDs) are rendered by the browser or browser-like agent, and in the performance of the rendering, log message emissions pertaining to further user action are emitted.

User interaction can be detected (e.g., using any of the herein-disclosed instrumentation techniques) and log messages can be emitted to be sent as packets over the shown upload path. As such any web pages and/or web applications can communicate with components of the cloud-based shared content storage service 501 (e.g., analytics server 153, collaboration server 152, etc.) to invoke and execute certain operations pertaining to protocols for measuring and logging how users interact with deployed applications.

In the embodiment of FIG. 5A, the DOM parser 202 is operational on client-side devices, and performs at least some of the aforementioned operations pertaining to the aforementioned protocol. In another embodiment, the DOM parser is operational on server-side devices, and performs certain operations pertaining to said protocol. Such a partitioning, and its impact to the protocol is shown and discussed as pertaining to FIG. 5B.

Figure 5B:
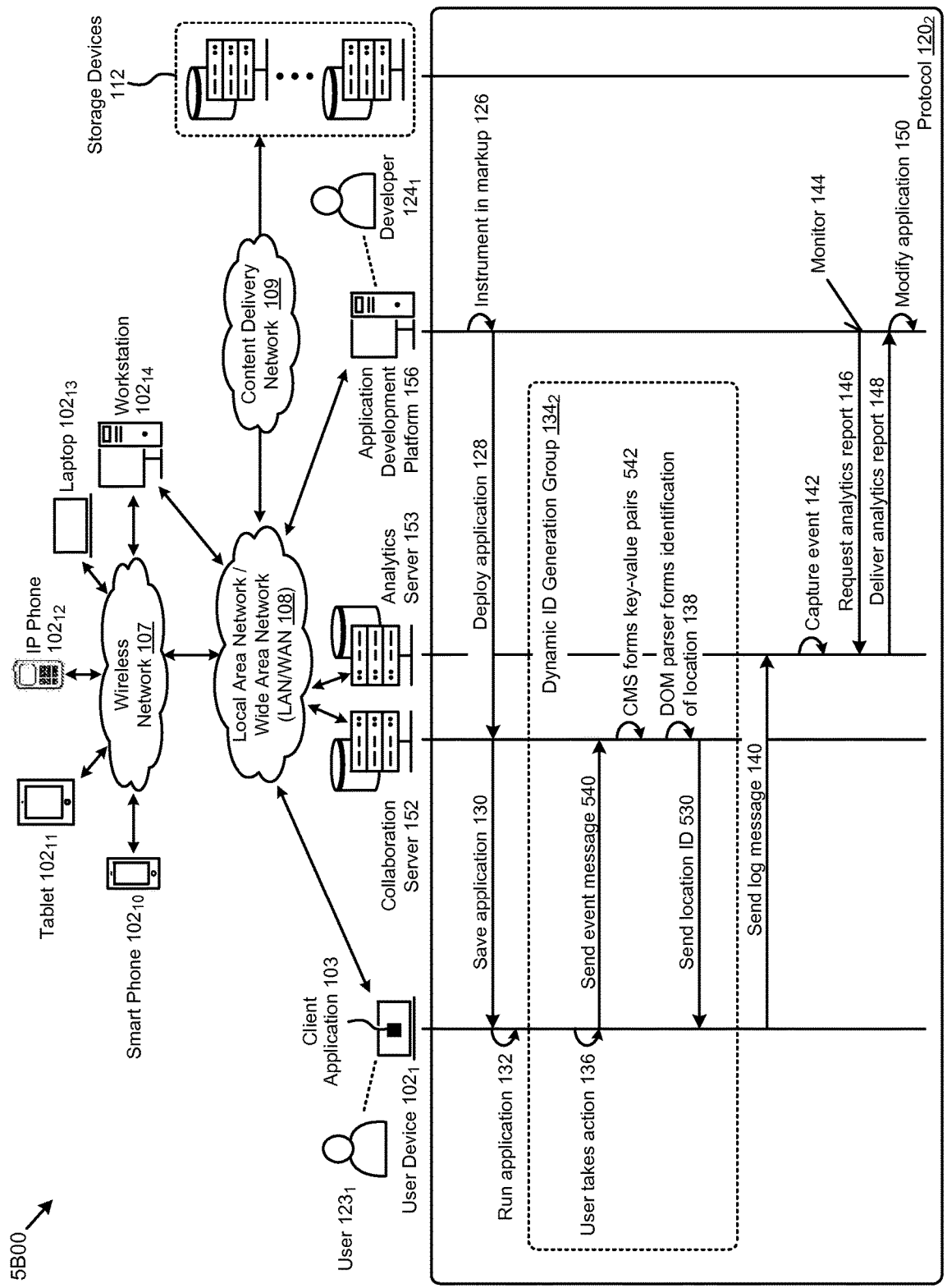
FIG. 5B depicts a deployment environment for hosting web pages and/or web applications that implement server-side, dynamically-generated instrumentation locator IDs based on a document object model, according to an embodiment.

FIG. 5B depicts a deployment environment 5B00 for hosting web pages and/or web applications that implement dynamically-generated instrumentation locator IDs based on a document object model. As an option, one or more variations of deployment environment 5B00 or any aspect thereof may be implemented in the context of the architecture and functionality of the embodiments described herein. Also, the deployment environment 5B00 or any aspect thereof may be implemented in any environment.

The embodiment shown in FIG. 5B depicts a protocol $120_2$ for using analytics in a cloud-based collaboration environment. A portion of the protocol implements analytics using a combination of client-side instrumentation together with server-side DOM parsing support. The dynamic ID generation group $134_2$ includes a message to send an event to the server (see message 540). User interaction with a web application (see operation 136) causes collection of and/or dynamic generation of instrumented content. For example operation 542 pertains to dynamic generation of instrumented content where a content management system forms key-value pairs in accordance with an instrumentation format template. A DOM parser generates a location identifier pertaining to the location of a particular instrumented list item or screen device (see operation 138), and a message sent by the server (see message 530) to advise the client-side of the location identifier as determined by the server after DOM processing. A log message (see message 140) pertaining to the user action is sent to the analytics server.

Figure 6:
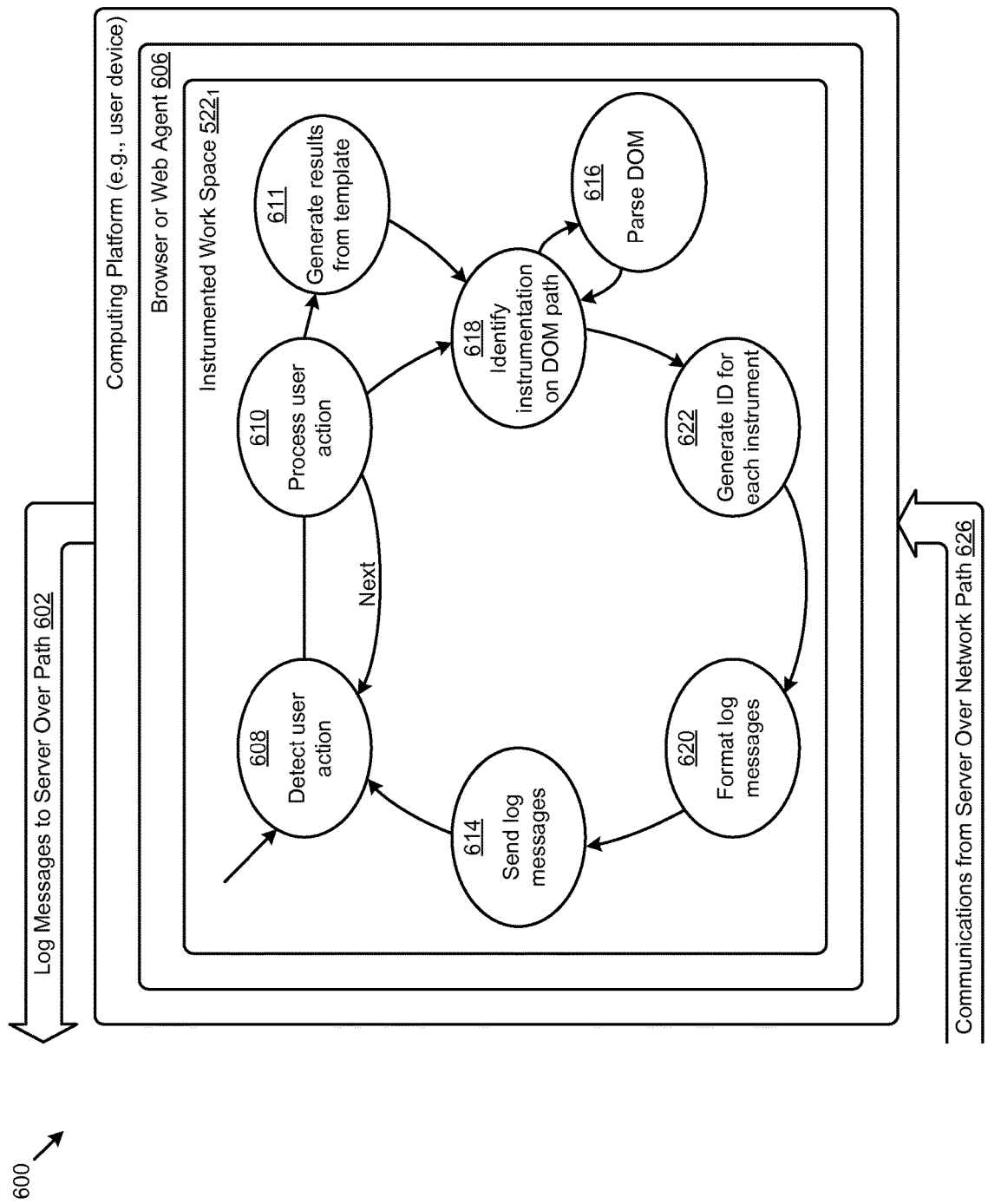
FIG. 6 presents a system including a state diagram having operations to implement dynamically-generated instrumentation locator IDs based on a document object model, according to an embodiment.

FIG. 6 presents a system 600 including a state diagram having operations to implement dynamically-generated instrumentation locator IDs based on a document object model. As an option, one or more variations of the system 600 or any aspect thereof may be implemented in the context of the architecture and functionality of the embodiments described herein. Also, the system 600 or any aspect thereof may be implemented in any environment.

The embodiment shown in FIG. 6 depicts an instrumented workspace $522_1$ running in the context of a browser or web agent 606, which in turn is running on a computing platform such as a user device. The instrumented workspace is deployed as a set of web pages that includes behaviors implemented by one or more scripts (e.g., JavaScript). A scripting language can implement any aspects of a state diagram. Strictly as one example, the state diagram commences upon entering state 608, during which state one or more user actions can occur, and during which state a user action (e.g., click, or keypress event, or hover event, or a menu pull-down event, or a multi-touch event, or a change event, etc.) can be detected. Upon detection, the next state (see state 610) is entered to process the user action. In some cases, processing user action includes dynamic generation of instrumented content where a content management system generates results (e.g., search results), and then injects key-value pairs in accordance with an instrumentation format template (see state 611). In some cases the only instrumentation present is instrumentation that is associated with a static screen device. In some cases there is no instrumentation associated with the user action event. In cases where there is instrumentation associated with the event, the state 618 is entered to identify the instrumentation. As shown, the process to identify the instrumentation can enter state 616, which in turn invokes processing such as may be provided in a DOM parser. The location of the instrument is determined by the DOM parser and/or by operation of portions of a protocol to invoke a DOM parser. Results of processing within state 616 and/or results of processing within state 618 are used to form a unique ID pertaining to the instrument and occurrence of an action using the instrument. A unique ID pertaining to the instrument and occurrence of an action using the instrument can be formed using an action occurrence ID (e.g., a unique sequencing number) and/or a random number. Having such a unique ID, one or more log messages can be formatted in state 620, and such one or more log messages can be sent (e.g., to a server) in state 614. For example, such log messages can be sent to an analytics server over a network to a network port (e.g., over network path 602). The content of the log message as well as the formatting of the log message content can be based, at least in part, on the fields that the DOM parser encounters during the path traversal.

In some cases, state 616 operates cooperatively with a server (e.g., refer to dynamic ID generation group $134_2$), which server performs at least some operations pertaining to parsing the DOM. Results from the server (e.g., results of operations pertaining to parsing the DOM) can be delivered to the browser or web agent 606 over a network (e.g., over network path 626).

ADDITIONAL EMBODIMENTS OF THE DISCLOSURE

Additional Practical Application Examples

Figure 7A:
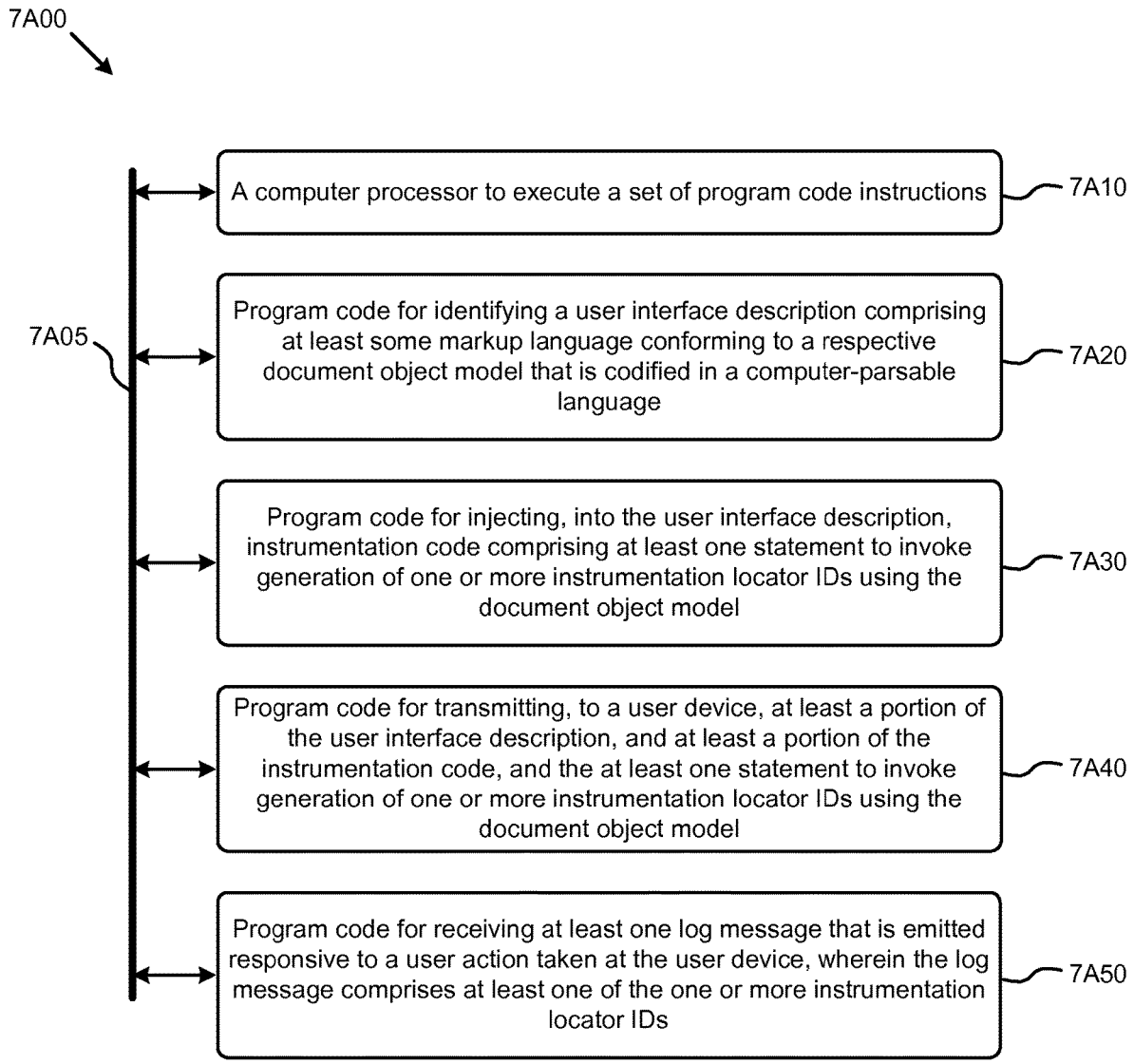
FIG. 7A and FIG. 7B depict system components as arrangements of computing modules that are interconnected so as to implement certain of the herein-disclosed embodiments.

FIG. 7A depicts a system 7A00 as an arrangement of computing modules that are interconnected so as to operate cooperatively to implement certain of the herein-disclosed embodiments. The partitioning of system 7A00 is merely illustrative and other partitions are possible.

FIG. 7A depicts a block diagram of a system to perform certain functions of a computer system. As an option, the present system 7A00 may be implemented in the context of the architecture and functionality of the embodiments described herein. Of course, however, the system 7A00 or any operation therein may be carried out in any desired environment. The system 7A00 comprises at least one processor and at least one memory, the memory serving to store program instructions corresponding to the operations of the system. As shown, an operation can be implemented in whole or in part using program instructions accessible by a module. The modules are connected to a communication path 7A05, and any operation can communicate with other operations over communication path 7A05. The modules of the system can, individually or in combination, perform method operations within system 7A00. Any operations performed within system 7A00 may be performed in any order unless as may be specified in the claims.

The shown embodiment implements a portion of a computer system, presented as system 7A00, comprising a computer processor to execute a set of program code instructions (see module 7A10) and modules for accessing memory to hold program code instructions to perform: identifying a user interface description comprising at least some markup language conforming to a respective document object model that is codified in a computer-readable language (see module 7A20); injecting, into the user interface description, instrumentation code comprising at least one statement to invoke generation of one or more instrumentation locator IDs using the document object model (see module 7A30); transmitting, to a user device, at least a portion of the user interface description, and at least a portion of the instrumentation code, and the at least one statement to invoke generation of one or more instrumentation locator IDs using the document object model (see module 7A40); and receiving at least one log message that is emitted responsive to a user action taken at the user device, wherein the log message comprises at least one of the one or more instrumentation locator IDs (see module 7A50).

Figure 7B:
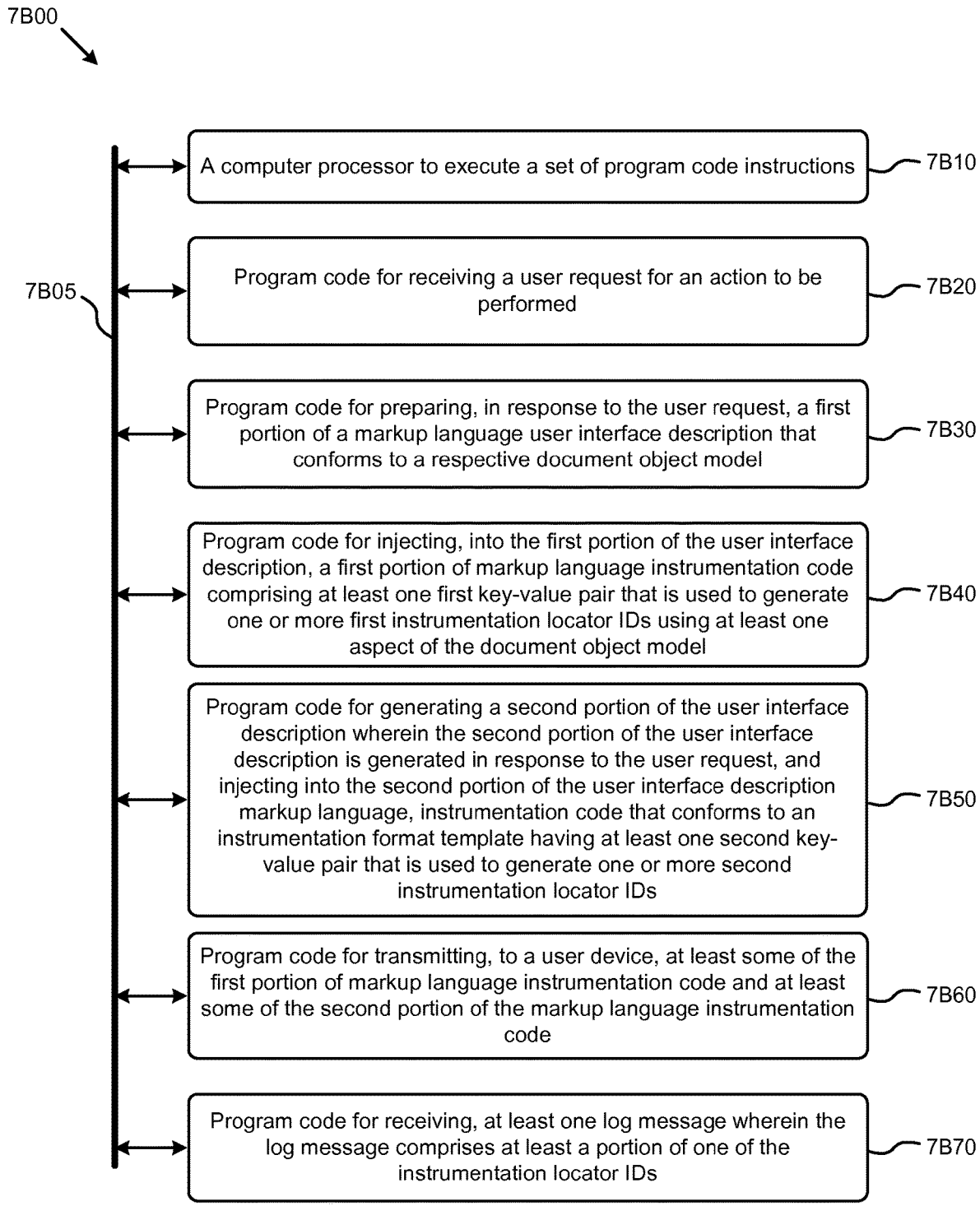

FIG. 7B depicts a system 7B00 as an arrangement of computing modules that are interconnected so as to operate cooperatively to implement certain of the herein-disclosed embodiments. The partitioning of system 7B00 is merely illustrative and other partitions are possible. As an option, the present system 7B00 may be implemented in the context of the architecture and functionality of the embodiments described herein. Of course, however, the system 7B00 or any operation therein may be carried out in any desired environment.

The system 7B00 comprises at least one processor and at least one memory, the memory serving to store program instructions corresponding to the operations of the system. As shown, an operation can be implemented in whole or in part using program instructions accessible by a module. The modules are connected to a communication path 7B05, and any operation can communicate with other operations over communication path 7B05. The modules of the system can, individually or in combination, perform method operations within system 7B00. Any operations performed within system 7B00 may be performed in any order unless as may be specified in the claims.

The shown embodiment implements a portion of a computer system, presented as system 7B00, comprising a computer processor to execute a set of program code instructions (see module 7B 10) and modules for accessing memory to hold program code instructions to perform: receiving a user request for an action to be performed (see module 7B20); preparing, in response to the user request, a first portion of a markup language user interface description that conforms to a respective document object model (see module 7B30); injecting, into the first portion of the user interface description, a first portion of markup language instrumentation code comprising at least one first key-value pair that is used to generate one or more first instrumentation locator IDs using at least one aspect of the document object model (see module 7B40); generating a second portion of the user interface description wherein the second portion of the user interface description is generated in response to the user request injecting, into the second portion of the user interface description markup language, instrumentation code that conforms to an instrumentation format template having at least one second key-value pair that is used to generate one or more second instrumentation locator IDs (see module 7B50); transmitting, to a user device, at least some of the first portion of markup language instrumentation code and at least some of the second portion of the markup language instrumentation code (see module 7B60); and receiving at least one log message wherein the log message comprises at least a portion of one of the instrumentation locator IDs (see module 7B70).

SYSTEM ARCHITECTURE OVERVIEW

Additional System Architecture Examples

Figure 8A:
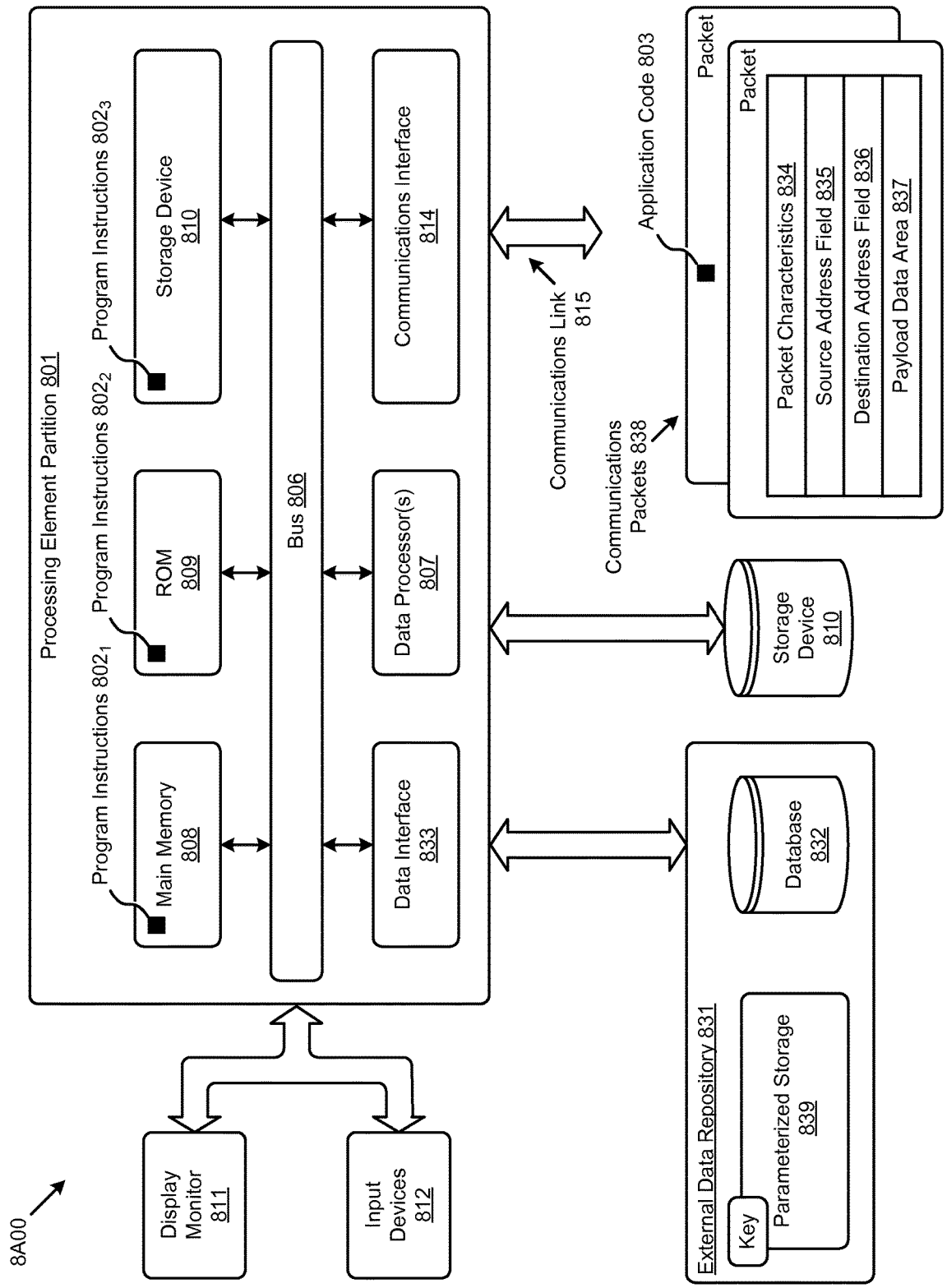
FIG. 8A and FIG. 8B depict exemplary architectures of components suitable for implementing embodiments of the present disclosure, and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information. The bus interconnects subsystems and devices such as a central processing unit (CPU), or a multi-core CPU (e.g., data processor 807), a system memory (e.g., main memory 808, or an area of random access memory (RAM)), a non-volatile storage device or non-volatile storage area (e.g., read-only memory 809), an internal or external storage device 810 (e.g., magnetic or optical), a data interface 833, a communications interface 814 (e.g., PHY, MAC, Ethernet interface, modem, etc.). The aforementioned components are shown within processing element partition 801, however other partitions are possible. The shown computer system 8A00 further comprises a display 811 (e.g., CRT or LCD), various input devices 812 (e.g., keyboard, cursor control), and an external data repository 831.

According to an embodiment of the disclosure, computer system 8A00 performs specific operations by data processor 807 executing one or more sequences of one or more program code instructions contained in a memory. Such instructions (e.g., program instructions $802_1$, program instructions $802_2$, program instructions $802_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 8A00 performs specific networking operations using one or more instances of communications interface 814. Instances of the communications interface 814 may comprise one or more networking ports that are configurable (e.g., pertaining to speed, protocol, physical layer characteristics, media access characteristics, etc.) and any particular instance of the communications interface 814 or port thereto can be configured differently from any other particular instance. Portions of a communication protocol can be carried out in whole or in part by any instance of the communications interface 814, and data (e.g., packets, data structures, bit fields, etc.) can be positioned in storage locations within communications interface 814, or within system memory, and such data can be accessed (e.g., using random access addressing, or using direct memory access DMA, etc.) by devices such as data processor 807.

The communications link 815 can be configured to transmit (e.g., send, receive, signal, etc.) any types of communications packets 838 comprising any organization of data items. The data items can comprise a payload data area 837, a destination address 836 (e.g., a destination IP address), a source address 835 (e.g., a source IP address), and can include various encodings or formatting of bit fields to populate the shown packet characteristics 834. In some cases the packet characteristics include a version identifier, a packet or payload length, a traffic class, a flow label, etc. In some cases the payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 807 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 831, which in turn can be formatted into any one or more storage areas, and which can comprise parameterized storage 839 accessible by a key (e.g., filename, table name, block address, offset address, etc.).

Execution of the sequences of instructions to practice certain embodiments of the disclosure are performed by a single instance of the computer system 8A00. According to certain embodiments of the disclosure, two or more instances of computer system 8A00 coupled by a communications link 815 (e.g., LAN, PTSN, or wireless network) may perform the sequence of instructions required to practice embodiments of the disclosure using two or more instances of components of computer system 8A00.

The computer system 8A00 may transmit and receive messages such as data and/or instructions organized into a data structure (e.g., communications packets 838). The data structure can include program instructions (e.g., application code 803), communicated through communications link 815 and communications interface 814. Received program code may be executed by data processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key).

The processing element partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 807. Some embodiments include one or more special-purpose hardware components (e.g., power control, logic, sensors, transducers, etc.). A module may include one or more state machines and/or combinational logic used to implement or facilitate the operational and/or performance characteristics of dynamic generation of instrumentation locator IDs from a document object model.

Various implementations of the database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of dynamic generation of instrumentation locator IDs from a document object model). Such files or records can be brought into and/or stored in volatile or non-volatile memory.

Figure 8B:
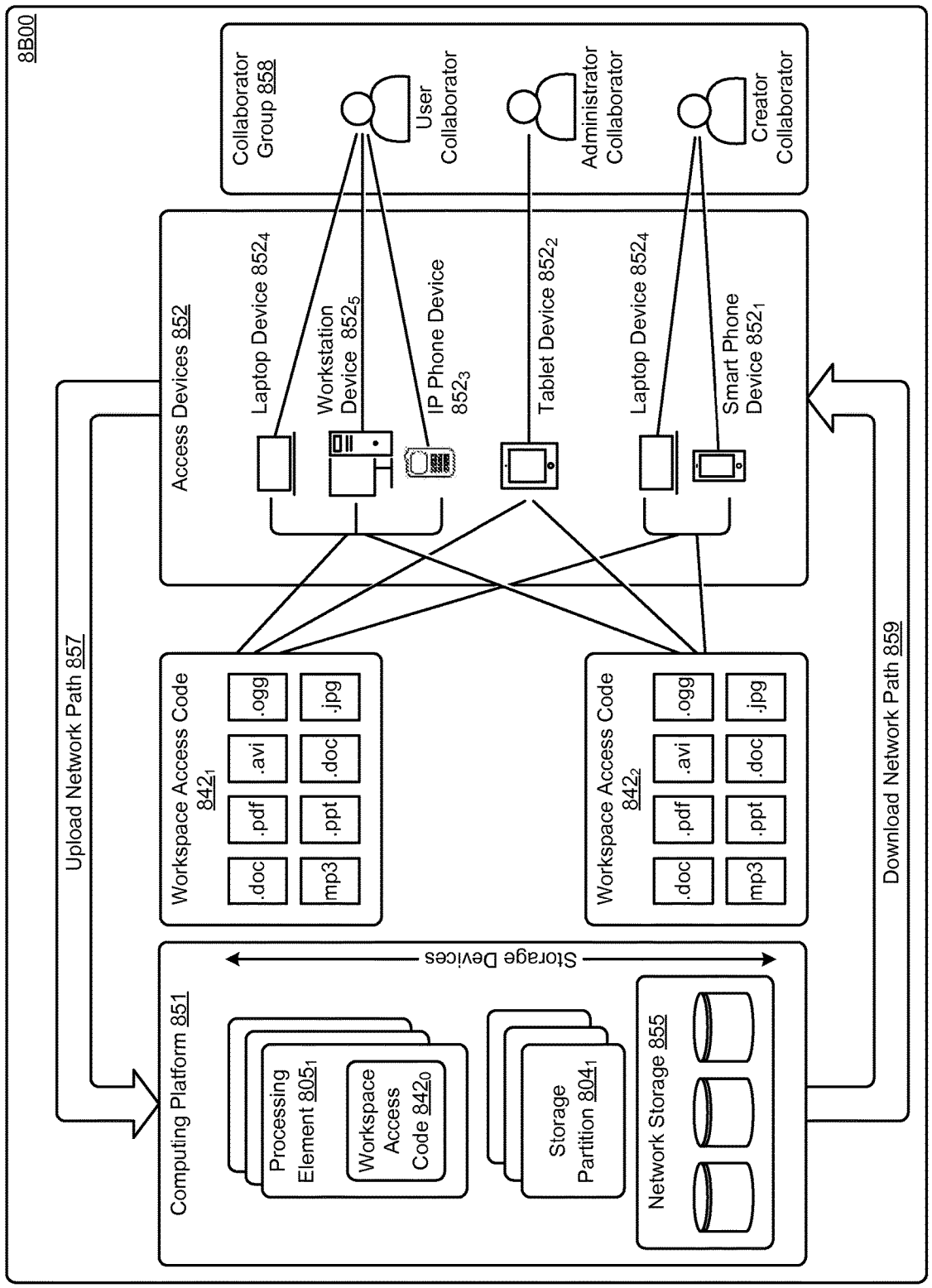

FIG. 8B depicts a block diagram of an instance of a cloud-based environment 8B00. Such a cloud-based environment supports access to workspaces through the execution of workspace access code (e.g., workspace access code 842$_0$, workspace access code 842$_1$, and workspace access code 842$_2$) Workspace access code can be executed on any of the shown access devices 852 (e.g., laptop device 852$_4$, workstation device 852$_5$, IP phone device 852$_3$, tablet device 852$_2$, smart phone device 852$_1$, etc.). A group of users can form a collaborator group 858, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Also, a portion of the workspace access code can reside in and be executed on any computing platform 851, including in a middleware setting. As shown, a portion of the workspace access code resides in and can be executed on one or more processing elements (e.g., processing element 805$_1$). The workspace access code can interface with storage devices such the shown networked storage 855. Storage of workspaces and/or any constituent files or objects, and/or any other code or scripts or data can be stored in any one or more storage partitions (e.g., storage partition 804$_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 857). A stored workspace can be delivered to a particular user and/or shared with other particular users via a download (e.g., a download from a processing element to an access device over a download network path 859).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method comprising:
    detecting a first user request for a first action to be performed on a first version of a web page deployed at a user device, wherein the first version of the web page comprises first instrumented markup language and the first instrumented markup language causes dynamic generation of first instrumentation locator IDs based on a first document object model (DOM) for the first version of the web page in response to corresponding user actions, the first user request corresponding to a first element in the first version of the web page described by the first DOM;
    dynamically generating, in response to receiving the first user request for the first action, a first instrumentation locator ID based on a first DOM for the first version of the web page, by:
        invoking, in response to the first user request, a DOM parser to generate the first instrumentation locator ID,
        parsing, by the DOM parser, the first DOM to identify a first plurality of hierarchical element names derived from the first DOM that represents a first path to the first element used to trigger the first action, and
        generating the first instrumentation locator ID based on the first path, wherein the first instrumentation locator ID comprise at least multiple hierarchical element names in the first path to the first element in the web page used to trigger the first action;
    generating a first message comprising at least the first instrumentation locator ID;
    detecting a second user request for a second action to be performed on a second version of the web page deployed at the user device, wherein the second version of the web page comprises second instrumented markup language and the second instrumented markup language causes dynamic generation of second instrumentation locator IDs based on a second DOM for the second version of the web page in response to corresponding user actions, the second user request corresponding to a second element in the second version of the web page described by the second DOM;

dynamically generating, in response to receiving the second user request for the second action, a second instrumentation locator ID based on a second DOM for the second version of the web page, by:

invoking, in response to the second user request, the DOM parser to generate the second instrumentation locator ID, parsing, by the DOM parser, the second DOM to identify a second plurality of hierarchical element names derived from the second DOM that represents a second path to the second element used to trigger the second action, and generating the second instrumentation locator ID based on the second path, wherein the second instrumentation locator ID comprises at least multiple hierarchical element names in the second path to the second element of the web page used to trigger the second action, wherein at least one dynamically generated instrumentation locator ID for the first version of the web page is different from at least one dynamically generated instrumentation locator ID for the second version of the web page as a result of processing the second DOM; and generating a second message comprising at least the second instrumentation locator ID.

2. The method of claim 1, wherein the first and second messages comprise messages conforming to an instrumentation template, and the first and second messages further comprise a collaborator count.

3. The method of claim 1, wherein the first and second paths each comprise two or more of a client element, an application identifier element, a page identifier element, a component identifier element, a feature element, or a target element.

4. The method of claim 1, wherein the first and second instrumentation locator IDs are not static tracking IDs generated prior to the detection of the first or second actions respectively.

5. The method of claim 1, further comprising identifying at least one user characteristic pertaining to at least the user device, and wherein the first message or the second message further comprises the at least one user characteristic.

6. The method of claim 1, wherein the first and second messages further comprise respective occurrence IDs.

7. The method of claim 6, wherein the occurrence ID is formed using at least one of a unique sequencing number, a random number, or any combination thereto.

8. The method of claim 1, wherein the DOM parser is packaged together with a user interface description.

9. The method of claim 1, wherein a document object model is at least one of, an XML DTD, or an XML schema, or an HTML schema, or an XHTML schema, or any combination thereof.

10. A computer program product in comprising a non-transitory computer readable medium, having stored thereon a sequence of instructions which, when stored in memory and executed by a processor causes a set of acts, the set of acts comprising:

detecting a first user request for a first action to be performed on a first version of a web page deployed at a user device, wherein the first version of the web page comprises first instrumented markup language and the first instrumented markup language causes dynamic generation of first instrumentation locator IDs based on a first document object model (DOM) for the first version of the web page in response to corresponding user actions, the first user request corresponding to a first element in the first version of the web page described by the first DOM;

dynamically generating, in response to receiving the first user request for the first action, a first instrumentation locator ID based on a first DOM for the first version of the web page, by:

invoking, in response to the first user request, a DOM parser to generate the first instrumentation locator ID, parsing, by the DOM parser, the first DOM to identify a first plurality of hierarchical element names derived from the first DOM that represents a first path to the first element used to trigger the first action, and generating the first instrumentation locator ID based on the first path, wherein the first instrumentation locator ID comprises at least multiple hierarchical element names in the first path to the first element in the web page used to trigger the first action;

generating a first message comprising at least the first instrumentation locator ID;

detecting a second user request for a second action to be performed on a second version of the web page deployed at the user device, wherein the second version of the web page comprises second instrumented markup language and the second instrumented markup language causes dynamic generation of second instrumentation locator IDs based on a second DOM for the second version of the web page in response to corresponding user actions, the second user request corresponding to a second element in the second version of the web page described by the second DOM;

dynamically generating, in response to receiving the second user request for the second action, a second instrumentation locator ID based on a second DOM for the second version of the web page, by:

invoking, in response to the second user request, the DOM parser to generate the second instrumentation locator ID, parsing, by the DOM parser, the second DOM to identify a second plurality of hierarchical element names derived from the second DOM that represents a second path to the second element used to trigger the second action, and generating the second instrumentation locator ID based on the second path, wherein the second instrumentation locator ID comprises at least multiple hierarchical element names in the second path to the second element of the web page used to trigger the second action, wherein at least one dynamically generated instrumentation locator ID for the first version of the web page is different from at least one dynamically generated instrumentation locator ID for the second version of the web page as a result of processing the second DOM; and generating a second message comprising at least the second instrumentation locator ID.

11. The computer program product of claim 10, wherein the first and second messages comprise messages conforming to an instrumentation template, and the first and second messages further comprise a collaborator count.

12. The computer program product of claim 10, wherein the first and second paths each comprise two or more of a client element, an application identifier element, a page identifier element, a component identifier element, a feature element, or a target element.

13. The computer program product of claim 10, wherein the first and second instrumentation locator IDs are not static tracking IDs generated prior to the detection of the first or second actions respectively.

14. The computer program product of claim 13, wherein the set of acts further comprise identifying at least one user characteristic pertaining to at least the user device, and wherein the first message or the second message further comprises the at least one user characteristic.

15. The computer program product of claim 10, wherein the first and second messages further comprise respective occurrence IDs.

16. The computer program product of claim 10, wherein a document object model is at least one of, an XML DTD, or an XML schema, or an HTML schema, or an XHTML schema, or any combination thereof.

17. A system comprising:
a user device, comprising a processor and a memory, to receive user requests for an action to be performed on a web page; and
the user device performs acts of:
receiving a first user request for a first action to be performed on a web page;
detecting a first user request for a first action to be performed on a first version of a web page deployed at a user device, wherein the first version of the web page comprises first instrumented markup language and the first instrumented markup language causes dynamic generation of first instrumentation locator IDs based on a first document object model (DOM) for the first version of the web page in response to corresponding user actions, the first user request corresponding to a first element in the first version of the web page described by the first DOM;
dynamically generating, in response to receiving the first user request for the first action, a first instrumentation locator ID based on a first DOM for the first version of the web page, by:
invoking, in response to the first user request, a DOM parser to generate the first instrumentation locator ID,
parsing, by the DOM parser, the first DOM to identify comprising a first plurality of hierarchical element names derived from the first DOM that represents a first path to the first element used to trigger the first action, and
generating the first instrumentation locator ID based on the first path, wherein the first instrumentation locator ID comprises at least multiple hierarchical element names in the first path to the first element in the web page used to trigger the first action;
generating a first message comprising at least the first instrumentation locator ID;
detecting a second user request for a second action to be performed on a second version of the web page deployed at the user device, wherein the second version of the web page comprises second instrumented markup language and the second instrumented markup language causes dynamic generation of second instrumentation locator IDs based on a second DOM for the second version of the web page in response to corresponding user actions, the second user request corresponding to a second element in the second version of the web page described by the second DOM;
dynamically generating, in response to receiving the second user request for the second action, a second instrumentation locator ID based on a second DOM for the second version of the web page, by:
invoking, in response to the second user request, the DOM parser to generate the second instrumentation locator ID,
parsing, by the DOM parser, the second DOM to identify a second plurality of hierarchical element names derived from the second DOM that represents a second path to the second element used to trigger the second action, and
generating the second instrumentation locator ID based on the second path, wherein the second instrumentation locator ID comprises at least multiple hierarchical element names in the second path to the second element of the web page used to trigger the second action, wherein at least one dynamically generated instrumentation locator ID for the first version of the web page is different from at least one dynamically generated instrumentation locator ID for the second version of the web page as a result of processing the second DOM; and
generating a second message comprising at least the second instrumentation locator ID.

18. The system of claim 17, wherein the first and second messages comprise messages conforming to an instrumentation template, and the first and second messages further comprise a collaborator count.

19. The system of claim 17, wherein the first and second paths each comprise two or more of a client element, an application identifier element, a page identifier element, a component identifier element, a feature element, or a target element.

20. The system of claim 17, wherein the first and second instrumentation locator IDs are not static tracking IDs generated prior to the detection of the first or second actions respectively.

* * * * *